(12) United States Patent
Scates

(10) Patent No.: US 7,953,620 B2
(45) Date of Patent: *May 31, 2011

(54) METHOD AND APPARATUS FOR CRITICAL INFRASTRUCTURE PROTECTION

(75) Inventor: Joseph F. Scates, Waldorf, MD (US)

(73) Assignee: Raytheon Company, Waltham, MA (US)

( * ) Notice: Subject to any disclaimer, the term of this patent is extended or adjusted under 35 U.S.C. 154(b) by 48 days.

This patent is subject to a terminal disclaimer.

(21) Appl. No.: 12/270,333

(22) Filed: Nov. 13, 2008

(65) Prior Publication Data

US 2010/0042472 A1 Feb. 18, 2010

Related U.S. Application Data

(63) Continuation of application No. 12/192,305, filed on Aug. 15, 2008.

(51) Int. Cl.
G06F 17/00 (2006.01)

(52) U.S. Cl. ...................................... 705/7.11
(58) Field of Classification Search ............... 705/7, 7.11
See application file for complete search history.

(56) References Cited

U.S. PATENT DOCUMENTS

| | | | |
|---|---|---|---|
| 6,134,664 A | 10/2000 | Walker | |
| 6,408,391 B1 | 6/2002 | Huff et al. | |
| 6,785,279 B1 * | 8/2004 | Crooks | 370/392 |
| 6,839,850 B1 | 1/2005 | Campbell et al. | |
| 6,895,383 B2 * | 5/2005 | Heinrich | 705/7 |
| 6,980,978 B2 | 12/2005 | Charron et al. | |
| 7,013,395 B1 | 3/2006 | Swiler et al. | |
| 7,234,059 B1 | 6/2007 | Beaver et al. | |
| 7,349,891 B2 | 3/2008 | Charron et al. | |
| 7,380,270 B2 | 5/2008 | Tracy et al. | |
| 7,417,547 B2 * | 8/2008 | Kennedy | 340/572.1 |
| 7,657,406 B2 | 2/2010 | Tolone et al. | |
| 2001/0027389 A1 * | 10/2001 | Beverina et al. | 703/22 |
| 2005/0080720 A1 * | 4/2005 | Betz et al. | 705/38 |
| 2005/0114186 A1 | 5/2005 | Heinrich | |
| 2005/0188171 A1 | 8/2005 | McIntosh | |
| 2006/0031938 A1 | 2/2006 | Choi | |
| 2006/0143711 A1 | 6/2006 | Huang et al. | |
| 2006/0156407 A1 | 7/2006 | Cummins | |
| 2007/0015506 A1 | 1/2007 | Hewett, Jr. et al. | |
| 2007/0016955 A1 | 1/2007 | Goldberg et al. | |

(Continued)

OTHER PUBLICATIONS

Leffler, L. et al., Electricity Sector Critical Infrastructure Protection and ESISAC®, North American Electric Reliability Council, Presention to Edison Electric Institute Security Committee, Sep. 24, 2003, pp. 1-33. (accessed at http://www.esisac.com/publicdocs/eeisc_sep2003.ppt, last visited Aug. 7, 2008).

(Continued)

*Primary Examiner* — Thomas Dixon
(74) *Attorney, Agent, or Firm* — Daly, Crowley, Mofford & Durkee, LLP

(57) ABSTRACT

A method of risk management across a mission support network is provided, including identifying a mission of the mission support network, and identifying, by a computer processor, assets of the mission support network. The assets include a mission asset to support the mission and a support asset to provide support to the mission asset. Each of the assets is characterized by a criticality index value to measure how important the asset is to a performance of the mission, and a vulnerability index value to measure a vulnerability of the asset to a threat.

7 Claims, 18 Drawing Sheets

U.S. PATENT DOCUMENTS

| | | | |
|---|---|---|---|
| 2007/0040895 | A1 | 2/2007 | Barbeau et al. |
| 2007/0067848 | A1 | 3/2007 | Gustave et al. |
| 2007/0072583 | A1 | 3/2007 | Barbeau et al. |
| 2007/0143849 | A1 | 6/2007 | Adar |
| 2007/0182577 | A1 | 8/2007 | Muralidharan et al. |
| 2007/0186283 | A1 | 8/2007 | Brumbaugh et al. |
| 2007/0261100 | A1 | 11/2007 | Greeson et al. |
| 2008/0047016 | A1* | 2/2008 | Spoonamore .................. 726/25 |

OTHER PUBLICATIONS

Paradigm Solutions, Mission Assurance, Jul. 22, 2008, pp. 1-2. (accessed at http://www.paradigmsolutions.com/solutions/sol_mission_assurance.aspx, last visited Jul. 22, 2008).

Notification of Transmittal of the International Search Report dated Feb. 1, 2010, PCT/US2009/053097.

The International Search Report dated Feb. 1, 2010, PCT/US2009/053097.

Written Opinion of the International Searching Authority dated Feb. 1, 2010, PCT/US2009/053097.

Leffler, L. et al., Electricity Sector Critical Infrastructure Protection and ESISAC®, North American Electric Reliability Council, Presenttion to Edison Electric Institute Security Committee, Sep. 24, 2003, pp. 1-33. (accessed at http://www.esisac.com/publicdocs/eeisc_sep2003.ppt, last visited Aug. 7, 2008).

Paradigm Solutions, Mission Assurance, Jul. 22, 2008, pp. 1-2. (accessed at http://www.paradigmsolutions.com/solutions/sol_mission_assurance.aspx, last visited Jul. 22, 2008).

U.S. Appl. No. 12/192,305, filed Aug. 15, 2008.

U.S. Appl. No. 12/266,817, filed Nov. 7, 2008.

Office Action dated Oct. 25, 2010 for U.S. Appl. No. 12/192,305, filed Aug. 15, 2008, 7 pages.

Office Action dated Oct. 21, 2010 for U.S. Appl. No. 12/266,817, filed Nov. 7, 2008, 9 pages.

Office Action dated Mar. 21, 2011 for U.S. Appl. No. 12/266,817 filed on Nov. 7, 2008, 6 pages.

Response to Office Action dated Mar. 21, 2011 for U.S. Appl. No. 12/266,817 filed on Nov. 7, 2008, 13 pages.

Notification Concerning Transmittal of International Preliminary Report on Patentability (Chapter 1 of the Patent Cooperation Treaty), PCT/US2009/053097, dated Feb. 24, 2011, 2 pages.

Written Opinion of the International Searching Authority, PCT/US2009/053097, dated Feb. 1, 2011, 5 pages.

* cited by examiner

Supporting Infrastructure Asset -- Description

Asset | Susceptibilities   Support Provided   Support Required   Visual   Fault Tree   Replace   Close All   Help

- 780 — Asset tab
- 781 — Sector: Communications
- 787 — Function: End Office Access Tandem / Integrated Systems
- 788 — System: Integrated PBX Switch System
- 782 — Asset Description: Dial Central Office
- 785 — Recognition Factor: Medium
- Critical Index Value: 47.92
- 786 — Vulnerability Level: 23.17
- Risk Assessment: None
- 783 — ID Num: 32
- 784 — Street Address: 140 West Street; Place Name: Manhattan; State/County: NY; Building or Area Name or Number: ; LAT: 7891534W; LONG: 123466N
- Risk Description:
- Risk Impact:
- 790 — window

FIG. 7A

METHOD AND APPARATUS FOR CRITICAL INFRASTRUCTURE PROTECTION

CROSS-REFERENCE TO RELATED APPLICATIONS

The present application is a continuation application of U.S. patent application Ser. No. 12/192,305, filed on Aug. 15, 2008, which is incorporated herein by reference.

FIELD OF THE INVENTION

The systems, techniques, and concepts described herein relate to cross-sector infrastructure and risk analysis in a time and scenario-dependent environment. In particular, the systems, techniques, and concepts relate to capturing risk and emergency management within an operational framework for conducting critical infrastructure protection.

BACKGROUND

Critical infrastructure is a term used by governments to describe critically important infrastructure assets that are essential for the functioning of a society and economy. Examples of recognized infrastructure sectors include Agriculture and Food, Banking and Finance, Chemical, Commercial Facilities, Commercial Nuclear Reactors, Materials and Waste, Dams, Defense Industrial Base, Drinking Water and Water Treatment Systems, Emergency Services, Energy, Government Facilities, Information Technology, National Monuments and Icons, Postal and Shipping, Public Health and Healthcare, Telecommunications, and Transportation Systems. Government agencies and private organization may protect these assets by implementing measures and plans to reduce risk to assets from threats and hazards including war, natural disasters, and terrorism.

Congressional legislation and presidential directives call for a comprehensive national approach for emergency preparedness and response. The Homeland Security Act of 2002 promulgates improved prevention, preparedness, response, recovery, mitigation capabilities and coordination processes across the country. The Homeland Security Presidential Directive (HSPD-5) directs the Secretary of Homeland Security to develop and administer a National Incident Management System, among other actions. The HSPD-8 directive requires a unified all-hazards preparedness that stresses collaboration and coordination at every level of government and in the private sector. The Critical Infrastructure Protection directive (PDD-63) calls for a national effort to assure the security of the increasingly vulnerable and interconnected infrastructure. Such efforts include implementing critical infrastructure programs (CIP), which are information-protection programs to enhance information sharing between the private sector and the government. Government agencies may use CIP to analyze and secure critical infrastructure and protected systems, identify vulnerabilities and develop risk assessments, and enhance recovery preparedness measures.

SUMMARY

In accordance with an embodiment of the present invention, a method of risk management across a mission support network includes identifying a mission of the mission support network and identifying, by a computer processor, assets of the mission support network. The assets include a mission asset to support the mission and a support asset to provide support to the mission asset. Further, each of the assets is characterized by a criticality index value to measure how important the asset is to a performance of the mission, and a vulnerability index value to measure a vulnerability of the asset to a threat. It is understood, however, that other assets may be included in the mission support network, and that these other assets need not be characterized by a criticality index value or a vulnerability index value.

In further embodiments, the method can include one or more of the following features: identifying an impact of a threat placed on the mission support network; managing a risk to the mission support network based on the impact of the threat; reducing the vulnerabilities of at least one of the assets, which may include reducing the vulnerability index value of at least one of the assets before an occurrence of the threat; identifying a mitigation action to mitigate the impact of the threat, which may include identifying a backup asset to replace at least one of the assets during an occurrence of the threat; and defining countermeasures to mitigate the risk. The support asset may further include a threatened asset upon which an impact of a threat is applied, in which case the method may include identifying the impact of the threat on the mission asset based on the support provided by the threatened support asset.

The mission support network may further include a first mission support network and a second mission support network coupled to the first mission support network. A first infrastructure asset may represent a first sector and a second infrastructure asset may represent a second sector.

In further embodiments, the method can include one or more of the following features: outputting the mission support network to enable display to a user; and applying a filter to the mission support network based on a role of the user. It should be noted that one or more of the method steps may be executed on a first and second computer processor, for example, a first and a second processor of a dual core processor chip. One of the processors may be configured to identify the mission and the assets of the mission support network and may direct the output of the mission support network to the other one of the processors to display the mission support network to a user.

In another aspect, an embodiment of the invention includes an article including a machine-readable medium that stores executable instructions to provide risk management across a mission support network. The executable instructions cause a machine to identify a mission of the mission support network and identify assets of the mission support network. The assets include a mission asset to support the mission and an infrastructure support asset to provide support to the mission asset. Each of the assets is characterized by a criticality index value to measure how important the asset is to a performance of the mission, and a vulnerability index value to measure a vulnerability of the asset to a threat.

In further embodiments, the executable instructions further cause a machine to perform one or more of the following: identifying an impact of a threat placed on the mission support network; managing a risk to the mission support network based on the impact of the threat; reducing the vulnerabilities of at least one of the assets, which may include reducing the vulnerability index value of at least one of the assets before an occurrence of the threat; identifying a mitigation action to mitigate the impact of the threat, which may include identifying a backup asset to replace at least one of the assets during an occurrence of the threat; and defining countermeasures to mitigate the risk. The support asset may further include a threatened asset upon which an impact of a threat is applied, in which case the executable instructions may cause a machine to identify the impact of the threat on the mission asset based on the support provided by the threatened asset.

In further embodiments, the executable instructions may further cause a machine to perform one or more of the following: outputting the mission support network to enable display to a user; and applying a filter to the mission support network based on a role of the user.

In another aspect, an embodiment of the invention includes a method of risk management across a mission support network including, on a display, displaying a mission of the mission support network and displaying assets of the mission support network. The assets include a mission asset to support the mission and an infrastructure support asset to provide support to the mission asset. Each of the assets is characterized by a displayed criticality index value to measure how important the asset is to a performance of the mission, and a displayed vulnerability index value to measure a vulnerability of the asset to a threat.

The mission asset may be displayed as a mission icon having an upper portion including a displayed value representing the criticality index value and a lower portion including a displayed value representing the vulnerability index value, and the support asset may be displayed as a support icon having an upper portion including a displayed value representing the criticality index value and a lower portion including a displayed value representing the vulnerability index value.

In further embodiments, the method can include one or more of the following: displaying an impact of a threat placed on the mission support network; managing a risk to the mission support network based on the displayed impact of the threat; reducing the vulnerabilities of at least one of the displayed assets; reducing the displayed vulnerability index value of at least one of the displayed assets before an occurrence of the threat; displaying a mitigation action to mitigate the impact of the threat; and displaying a backup asset to replace at least one of the displayed assets during an occurrence of the threat. The displayed support asset may further include a threatened asset upon which an impact of a threat is applied; and displaying the impact of the threat on the mission asset based on the support provided by the threatened asset.

It will be understood that the display may include more than one display, such as a first display for displaying a first portion of the mission support network and a second display for displaying a second portion of the mission support network.

BRIEF DESCRIPTION OF THE DRAWINGS

The foregoing features of this invention, as well as the invention itself, may be more fully understood from the following description of the drawings in which:

FIG. 7A is a pictorial representation of a display for infrastructure asset information in accordance with exemplary embodiments of the inventive systems, techniques, and concepts;

DETAILED DESCRIPTION

I. Definitions

Figure 1:
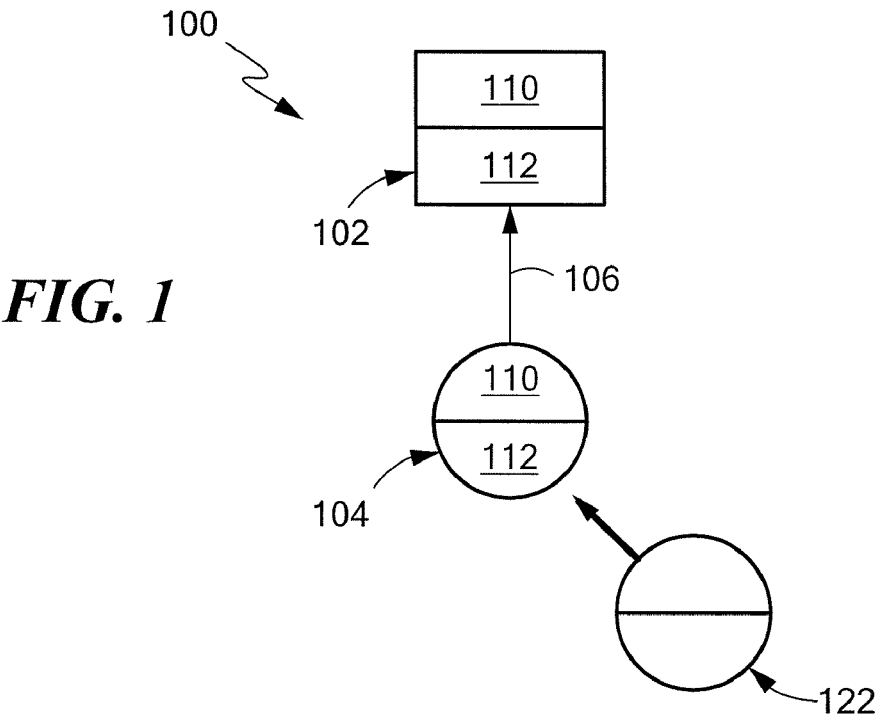
FIG. 1 is a diagram of a mission support network in accordance with exemplary embodiments of the inventive systems, techniques, and concepts.

Mission Support Network: A mission support network is a group of interlinked assets for performing various missions, capabilities, and functions of a sector, such as banking and finance, postal and shipping, transportation, agriculture, health and human services, water supply, energy, etc. For example, a mission support network for a banking and finance sector can support various missions such as trade execution. Trade execution can include operating the major stock exchanges, such as the New York Stock Exchange (NYSE), National Association of Securities Dealers Automated Quotation System (NASDAQ), and the American Stock Exchange (AMEX). Assets to support the stock exchanges can include communications and applications servers to support trade transactions, power stations to provide power to the exchanges, trucking services to deliver fuel to the power stations, and even fuel barges for delivering fuel from abroad. These assets can be interlinked, i.e., the NYSE asset can be supported by communications assets, which in turn are powered by the power stations. Other assets can include roads to allow stock exchange employees to travel to the NYSE trading location. Further, these assets may be interlinked across sectors, such as telecommunications sector assets (for example, private branch exchanges (PBX)) linked to power generation sector assets (for example, power lines, substations, and backup-generators), etc.

Mission asset: A mission asset is an asset that directly performs a mission/function/capability of a mission support network. For example, the NYSE can be a mission asset of a mission support network for performing trade execution missions of the banking and finance sector. Other mission assets may include the NASDAQ and AMEX.

Support asset: A support asset provides support to one or more mission assets. For example, a support asset for the NYSE mission asset may be a Dial Central Office that provides voice and data service to the NYSE. Further, a support asset may provide support to one or more other support assets.

Threat: A threat or threat event is an event that impacts a mission of a mission support network. An impact of a threat event describes how the threat event affects one or more infrastructure assets which support a mission. The threat event may cause an infrastructure asset to fail, in which case the infrastructure asset is unable to function, and/or to degrade, in which case the infrastructure asset has a diminished capacity to function. Threat events may be analyzed before the occurrence of the threat event, or during the occurrence of the threat event. Threat events may be subcategorized as either threats or hazards. Threats are described as those conditions or events initiated by human actors such as terrorists, disgruntled employees, or vandals with intent, malice, or forethought to cause harm or damage. Hazards are described as natural conditions or acts of nature such as floods, high winds, and earthquakes which may cause harm or damage. Hazards may also include dangers from mechanical wear and tear, or inherently dangerous equipment.

Risk: A risk is an assessment of an impact of a threat event to a mission of a mission support network. A risk may also include an assessment of the vulnerabilities of infrastructure assets. A risk may be mitigated through mitigation plans, countermeasures, reduction of asset vulnerabilities, and other means.

II. Description

In general overview, the inventive systems, techniques, methods described herein can be directed toward risk management across a mission support network, including identifying a mission and identifying mission and support assets for performing and supporting the mission. The assets include at least a mission asset and an infrastructure support asset to provide support to the mission asset. For example, a mission of a mission support network may be the running of a stock trading system, such as a stock exchange, and mission assets of the stock trading system may include the New York Stock Exchange (NYSE). An example support asset of the NYSE includes a telephone exchange asset to provide telecommunications services to the NYSE, a power generation asset to provide power to the NYSE, and/or a fuel asset to provide fuel to commuters employed at the NYSE. At least one of the assets is characterized by a criticality index value to measure how important at least one asset is to a performance of the mission, and a vulnerability index value to measure a vulnerability of at least one asset to a threat. The inventive systems, techniques, and methods described herein will now be described with reference to threat events applied to the mission support network. Such threat events may include natural disasters, such as a hurricane, or manmade events, such as terrorist attacks. In one aspect, the inventive systems, techniques, and methods reduce one or more vulnerabilities of the mission support network from threat events. Methods for reducing vulnerabilities of the mission support network from threat events include, but are not limited to, mitigation plans, which may include defining backup assets to replace degraded assets of the mission support network, and countermeasures, such as actions to reduce an asset's vulnerability.

Before a threat event, various federal, state, and local agencies such as the Department of Defense (DoD) and the Department of Homeland Security (DHS), as well as private organizations, can prepare critical infrastructure programs to deal with threats such as natural disasters and terrorist attacks by identifying critical missions of the mission support network. Further, these agencies and organizations can identify mission assets that allow the performance of the critical missions, as well as support assets that provide support to the mission assets. Agencies can conduct vulnerability assessments of the identified mission assets and infrastructure support assets and can reduce assessed vulnerabilities by, for example, defining countermeasures to offset the impact of a threat event to the missions and assets. Further, agencies can identify backup assets to replace infrastructure assets that may be degraded or that may fail during a threat event.

The agencies can develop risk mitigation plans and present their knowledge to other organizations to implement protection plans. Further, agencies and organizations can implement real-time systems to monitor mission support networks and identify and respond to threats and/or hazards placed on the mission support networks. During a threat event, for example, agencies can mitigate an impact of the threat by assessing the likely and/or most vulnerable assets. For example, a threat event may be a hurricane. The damage mechanisms of the hurricane include wind and water, and the most vulnerable assets are those in the direct path of the hurricane, especially those assets located near coastal land fall. Agencies may mitigate the impact to vulnerable assets (and the missions performed by these assets) by identifying backup assets and/or moving mobile assets to safer locations. Agencies may provide this information to first responders, and may monitor and update asset information throughout the threat event. Another example threat may be a terrorist attack, in which case agencies may assess the most likely targets, such as an airport and aircraft, and the damage mechanisms, such as hostage taking, explosive devices, etc.

After a threat event, for example, the aftermath of a hurricane, agencies can assess the damage to the mission support network including assessing the damage to assets and missions. Agencies can implement plans for restoration of the mission support network, and can analyze causes for degradation and/or failure of assets, including identifying further vulnerabilities and dependencies, as well as defining countermeasures to reduce vulnerabilities.

Referring to FIG. 1, the inventive systems, techniques, and concepts described herein are directed toward managing risk across a mission support network 100, which includes assets to perform and support various missions of the mission support network 100. In particular, a mission asset 102 directly performs a mission of the mission support network 100, and an infrastructure support asset 104 provides support to the mission asset 102. A support requirement link 106 between the mission asset 102 and the support asset 104 represents the support required by (and the support provided to) the mission asset 102. In general, a support asset 104 includes any infrastructure asset capable of providing the support required by the mission asset 102.

Each of the assets 102, 104 is characterized by a criticality index value 110, and a vulnerability index value 112. The criticality index value 110 is a measure of how important an asset is to the performance of a mission. The vulnerability index value 112 is a value representing an asset's level of vulnerability to any threat placed on the specific asset 102, 104. The criticality index values 110 and vulnerability index values 112 are further explained below.

In a further embodiment, the mission support network 100 includes a backup asset 122, which is an infrastructure asset identified to replace or supplement one or more of the other infrastructure assets in mission support network 100. For example, the backup asset 122 may fully replace a failed support asset 104, or make up for a reduced capacity of a degraded support asset 104.

Figure 2:
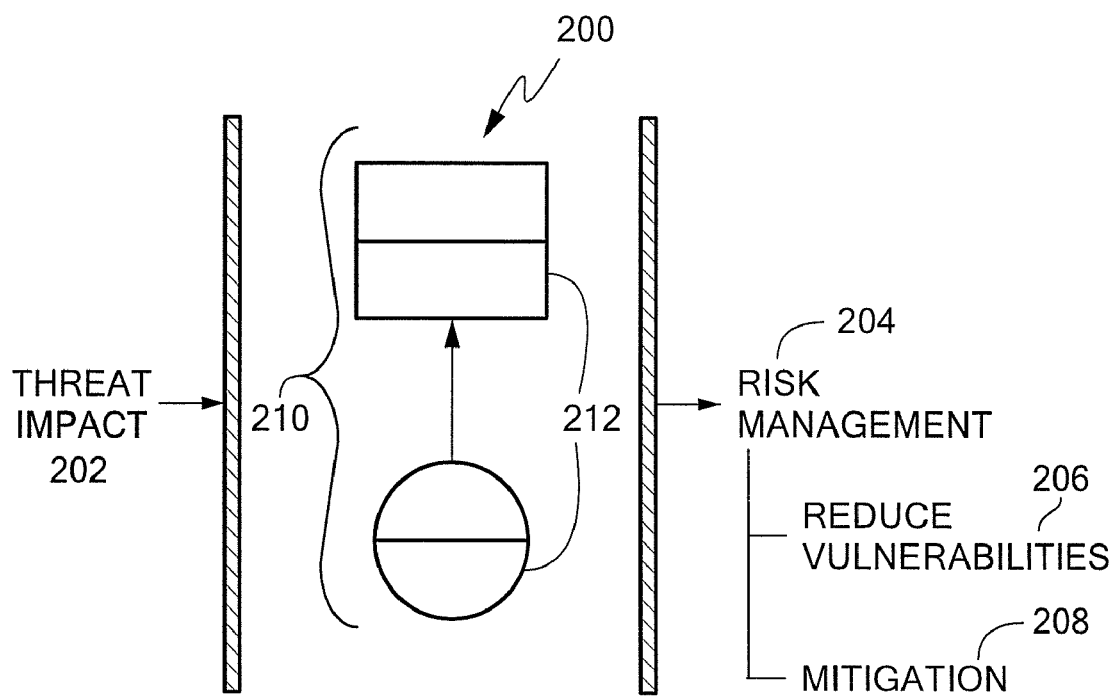
FIG. 2 illustrates a threat applied to the mission support network of FIG. 1 and risk management thereof.

Referring now to FIG. 2, the inventive systems, techniques, and concepts described herein include assessing an impact of a threat 202 placed on a mission support network 200, and providing risk management countermeasures 204 to the mission support network 200. The risk management countermeasures 204 may include reducing vulnerabilities 206 to one or more of the assets 210 of the mission support network 200 and/or defining mitigation plans 208 to mitigate the risk. For example, as further explained below, reducing vulnerabilities 206 may include reducing the vulnerability index value 212 of one or more assets 210. Reducing vulnerabilities 206 may include defining countermeasures such as actions including moving vulnerable assets to safer locations and/or camouflaging assets to make them less recognizable. Mitigation plans 208 may include identifying backup assets to replace or supplement failed or degraded infrastructure assets 210.

Figure 3:
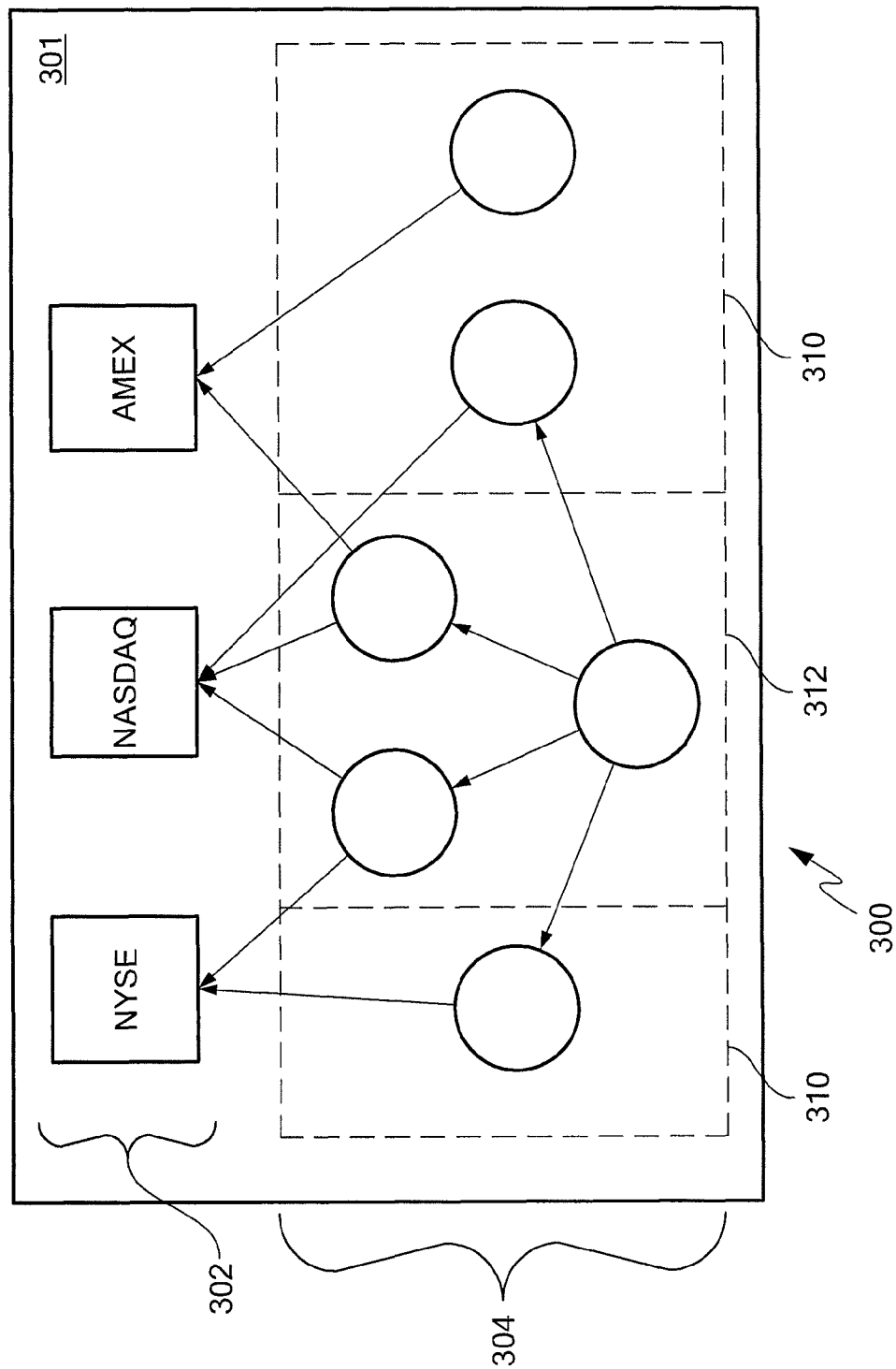
FIG. 3 is a diagram of a mission support network including multiple missions and coupled infrastructure assets in accordance with exemplary embodiments of the inventive systems, techniques, and concepts.

A mission support network may include a first mission support network coupled to a second mission support network. Referring to FIG. 3, an exemplary mission support network 300 may include mission assets 302 for supporting a mission 301. The mission assets 302 are supported by infrastructure support assets 304 coupled in a variety of ways based on the support required and support provided by each of the infrastructure assets. Further, one or more of the infrastructure assets may represent a first sector 310, and one or more other infrastructure assets may represent a second sector 312. For example, the first sector 310 may be a telecommunications sector and may include wireless carrier network assets such as cell towers and base stations, and the second sector 312 may be a power generation sector and may include utility assets such as power transmission lines, coal-fired reactors, and wind turbines. An asset may be shared between two or more sectors, for example, a railway line asset may be used to transport mail in a postal sector and commuters in a transportation sector. Also, in addition to an infrastructure asset 304 supporting a mission asset 302, an asset in one sector 312 may support an asset in the same sector 312 and/or another sector 310, thus creating intra (same) sector and inter (cross) sector dependencies.

Figure 4:
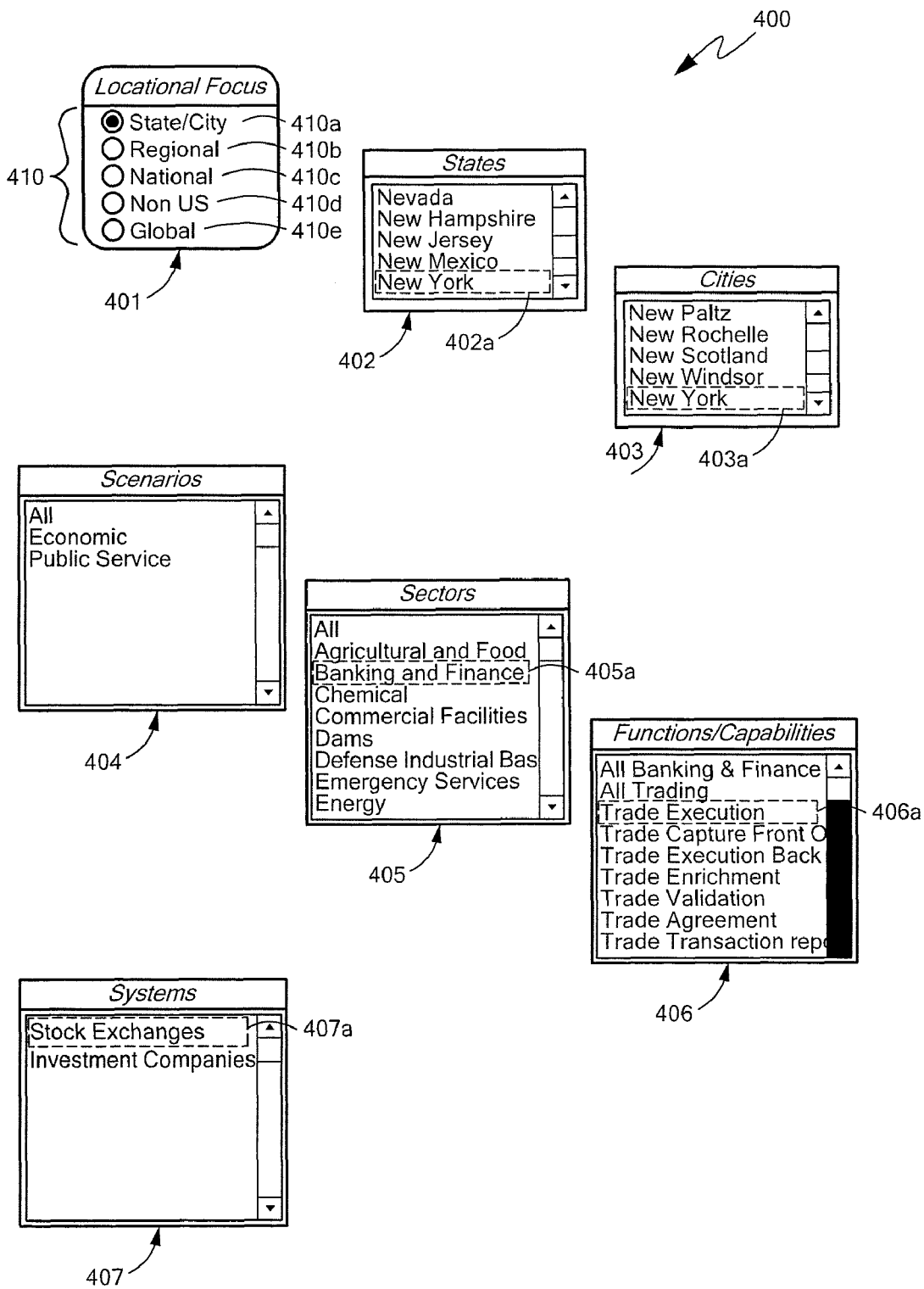
FIG. 4 is a pictorial representation of filters for a mission support network in accordance with exemplary embodiments of the inventive systems, techniques, and concepts.

In a further embodiment, the inventive systems, techniques, and concepts enable a user to select a mission of a mission support network and then display, within the user's area of responsibilities, the assets critical to accomplishing the mission. As shown in FIG. 4, the user may apply a series of role based filters 400 to select and display a subset of the assets, typically, based on the user's roles and responsibilities. Some filters are pre-designated based on the user's roles and responsibilities while other filters 400 include categories which the user may select to scale up or down the information to display within the user's roles and responsibilities. This scalability allows the user to focus on very detailed information in a small segment of the user's area of responsibility and/or to view all of the assets and missions in the user's area of responsibility.

Referring again to FIG. 4, the user can set single and/or multiple options in the filters 400. The user may only be able to select the filters 400 commensurate with the user's decision-making roles and responsibilities. Filters 400 include locational focus 401, states 402, and cities 403, as well as scenarios 404, sectors 405, functions/capabilities/missions 406, and systems 407. Other filters may also be included, such as filters for plans, missions, service components, and installations. The filters 400 may be designed to display information hierarchies and categories of information in the hierarchies. For example, each filter 400 may include categories 410 which may be selected to control the filters 400 lower in the information hierarchy. For example, the "Locational Focus" filter 401 consists of locational focus categories for state/city 410a, regional 410b, national 410c, non United States 410d, and global 410e. For example, when the user selects category state/city 410a from the locational focus filter 401, a list of states is presented in state filter 402 (when permits cities in the states to be displayed and selected). Further, when a user selects a state 402a in the state filter 402, for example, "New York", city filter 403 lists cities for the selected state 402a. The user may then select a city 403a in the city filter 403, for example, "New York".

Similarly, the user may select scenarios in the scenarios filter 404 and sectors in the sectors filter 405. For example, the user may select "Banking and Finance" 405a in the sector filter 405, which lists the various missions for the selected sector 405a in the functions/capabilities/missions filter 406. The user may further select a mission type 406a, for example, "Trade Execution" and then select a system type 407a in the systems filter 407 for the selected mission 406a. This allows the user to look at risks to all systems or selected system(s) that participate in performing the selected mission 406a. The filters 400 allow the user to view as broad as all of a selected sector's resources across the globe or as narrow as a single system of a selected sector in a single city. For example, top-level risk managers with broad responsibilities can look at "the whole picture", for example, an entire region's mission support network, while local asset managers with responsibilities within a city can look at details for a single system in that city.

In another embodiment, the inventive systems, techniques, and concepts described herein enable a user to display a mission support network. The mission support network may be within the user's areas of responsibilities. In still a further embodiment, the display of the mission support network is based on the selected and applied filters, as explained above.

The display includes mission assets that directly perform a selected mission. The process of determining the mission assets that directly perform the selected mission is accomplished through a mission requirements method explained below.

Figure 5:
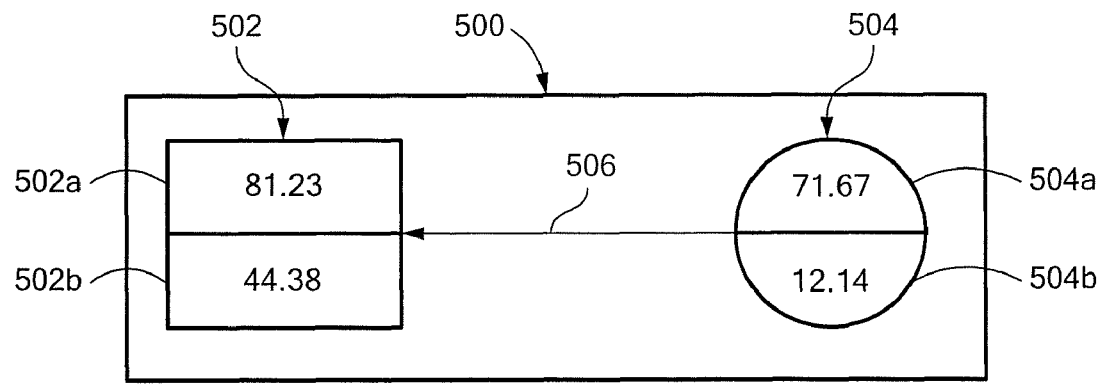
FIG. 5 is a pictorial representation of a mission support network having criticality index values and vulnerability index values in accordance with exemplary embodiments of the inventive systems, techniques, and concepts.

Referring now to FIG. 5, in a further embodiment, the display of the mission support network 500 includes asset icons depicting at least one mission asset 502 and at least one support asset 504 of the mission, as well as at least one inter-asset link 506 to indicate the support required by the mission asset and the support provided by the supporting infrastructure asset. In still a further embodiment, the display of the mission support network includes a geographic map wherein the mission and support assets are displayed on the map according to their geographic locations.

In a further embodiment, the mission asset icons 502 are displayed as a rectangle divided into an upper and lower half. Each half is color coded and contains a numerical value representing a criticality index value (upper half of the icon) 502a and vulnerability index value (lower half of the icon) 502b for the mission asset. Supporting infrastructure asset icons 504 are displayed as circles with an upper and lower half representing a respective criticality index value 504a and vulnerability index value 504b of the support asset. In still a further embodiment, the criticality index values 502a, 504a of the assets are normalized between 0 and 100. The criticality index values 502a, 504a may be based on how important that asset is to the performance of the selected mission compared to all other mission assets supporting the same mission and the vulnerability index values 502b, 504b may represent the level of vulnerabilities of the assets to threats.

The upper halves of the icons 502a, 504a may be also shaded in either red (highly critical), yellow (moderately critical), white (low criticality), or green (not critical). The color of the shading is based on user-defined numeric range bands for each color. For example, if the user defines the highly critical (red) range band to between the values of 80 and 100, the upper half of the icon representing a criticality index value of 81.23 would be shaded red because the value (81.23) is within that range band (80-100). However, if the user defines the highly critical range band to be between 82 and 100, and the moderately critical range band to between 70 and 82, the upper half of the icon would be shaded yellow. Note that the user-defined criticality range bands do not change the criticality index value of 81.23, only the color shading of the upper halves 502a, 504a of the infrastructure asset icons.

The lower halves of the icons 502b, 504b may be shaded in a manner similar to the color coding for upper halves of the icons 502a, 504a. The vulnerability index values are compared to the user-defined range bands highly vulnerable (red), moderately vulnerable (yellow), low vulnerability (white) or not vulnerable (green), and color shaded accordingly. Color shading may be further controlled by risk levels to assets. For example, a threat applied to an infrastructure asset may change a risk level of the asset and may produce a color change to reflect the risk level. The color for the risk level will never fall below the color for the vulnerability index value of the asset. Only the application of one of more countermeasures can reduce the vulnerability index values of an asset. Risk level is derived from a combination of factors, including impacts, vulnerability, and threats as further explained below.

Figure 6:
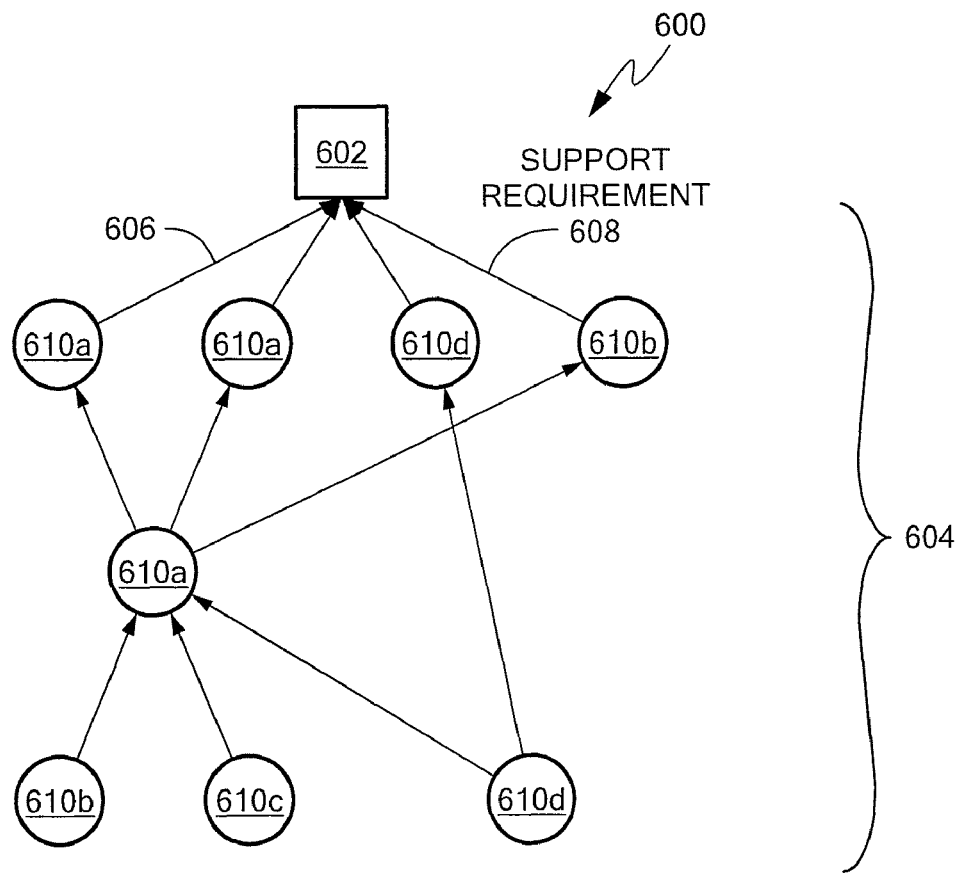
FIG. 6 is a pictorial representation of a mission support network including assets from multiple sectors in accordance with exemplary embodiments of the inventive systems, techniques, and concepts.

In another embodiment of the inventive systems, techniques, and concepts described herein, a top-down mission requirements based dependency method can be used to construct an exemplary mission support network 600 shown in FIG. 6. The mission support network 600 includes a mission asset 602, support assets 604, and links 606 between assets to indicate a support required 608 by the supported asset (and provided by the supporting asset 604). The mission support network 600 includes a single mission asset 602, eight support assets 604, and 11 support requirement links 606. In a further embodiment, the mission support network 600 includes support assets 604 from various sectors 610 that provide support, either directly or indirectly, to the mission asset 602. For example, FIG. 6 illustrates four sectors 610a, 610b, 610c, and 610d.

The top-down mission requirements based dependency method may start with two types of information about an asset, namely, information about a support provided by a supporting asset, and information about a support required by a supported asset. The support required and support provided information may be entered into a display window. A user may enter the information using input devices, such as a mouse and/or a keyboard, coupled to a computer system. The display window may be an output of a windowing system executed on computer hardware, as is known in the art. The computer hardware couples the user input to the windowing system, which updates the display window accordingly. An example of a windowing system includes Microsoft Windows™ from the Microsoft Corporation.

FIGS. 7A, 7B, 7C, 7D, 7E, and 7F illustrate exemplary display screens 700, 710, 720, 730, 740, and 750 to display and enter information for a support asset of a mission support network, such as the mission support network shown in FIG. 6. The display screens 700, 710, 720, 730, 740, 750 may include respective tab selection bars 790, 791, 792, 793, 794, 795 for selecting tabs for displaying and entering infrastructure asset information. The tabs may include an asset tab, a susceptibilities tab, a visual tab, fault tree tab, a support required tab, a support provided tab, etc.

Referring now to FIG. 7A, the asset tab 780 on display screen 700 includes information about an asset, such as an asset sector 781, asset function 787, asset system 788, and asset description 782, as well as a unique identification number 783, location 784 (country, state, city, street address, installation, building or area name or number, latitude and longitude), critical index value 785, vulnerability index value 786, information about a risk, one or more causes of the risk (i.e., an impact from a threat), a description of the potential impact to the mission being supported or performed by the asset due to the risk, and the calculated risk assessment for the asset. Further, information about mission assets may include a timeline to indicate when the mission asset becomes critical. For example, if a military unit is deploying by rail then the rail lines being used to deploy the unit are critical only during the time frame of the deployment. Time may be stated as a single point such as 10:00 AM daily or a time frame such as 10:00 AM to 5:00 PM Monday through Thursday. References to points in time may also be used. For example, the day a mission starts may be referred to as Start Day or "S", where "S+1" would be 1 day after start date, S+3 to S+5 would be days 3 through 5 after start date, etc. Information about support assets may include sector, function, system, and a recognition factor (high, medium, low, or none) to be explained in further detail below.

Figure 7B:
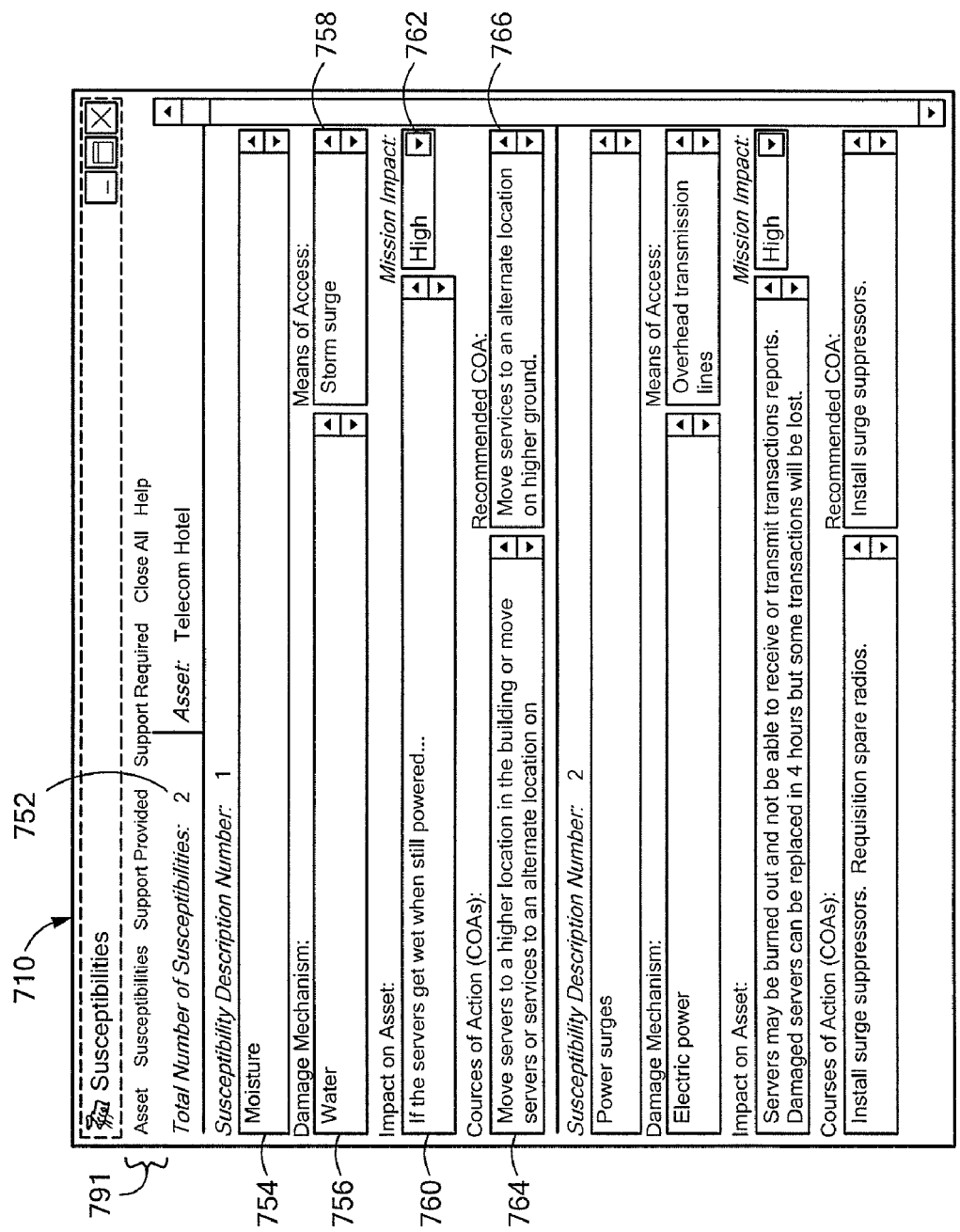
FIG. 7B is a pictorial representation of a display for infrastructure asset susceptibilities in accordance with exemplary embodiments of the inventive systems, techniques, and concepts.

As shown in FIG. 7B, the susceptibilities tab on display screen 710 includes information about infrastructure asset susceptibilities, which are entities, quantities, or mechanisms an infrastructure asset lacks an ability to resist. For example, an infrastructure asset, such as a Telecom Hotel, may be susceptible to water and power surges. The susceptibilities tab may include information such as the number susceptibilities of the infrastructure asset 752, a description of the susceptibility 754, a mechanism which will cause damage to the infrastructure asset 756, a means by which each damage mechanism can access the infrastructure asset 758, a description of impact of each damage on the infrastructure asset 760, a level of impact (high, medium, low or none) on the mission being performed by the asset as a result of the damage mechanism 762, one or more courses of action or countermeasures that can be applied to reduce the susceptibility or the vulnerability of the infrastructure asset to each damage mechanism or to mitigate an impact on the support being provided by the infrastructure asset 764, and a recommended course of action on the basis of the greatest reduction in vulnerability to each damage mechanism or the least amount of impact on the support being provided 766. The courses of action that can be applied to reduce the susceptibility or the vulnerability of the infrastructure asset to each damage mechanism can be referred to as "hardening" of the asset. Such courses of action are typically applied before an occurrence of a threat, for example, moving the Telecom Hotel to higher ground before an occurrence of a hurricane.

Figure 7C:
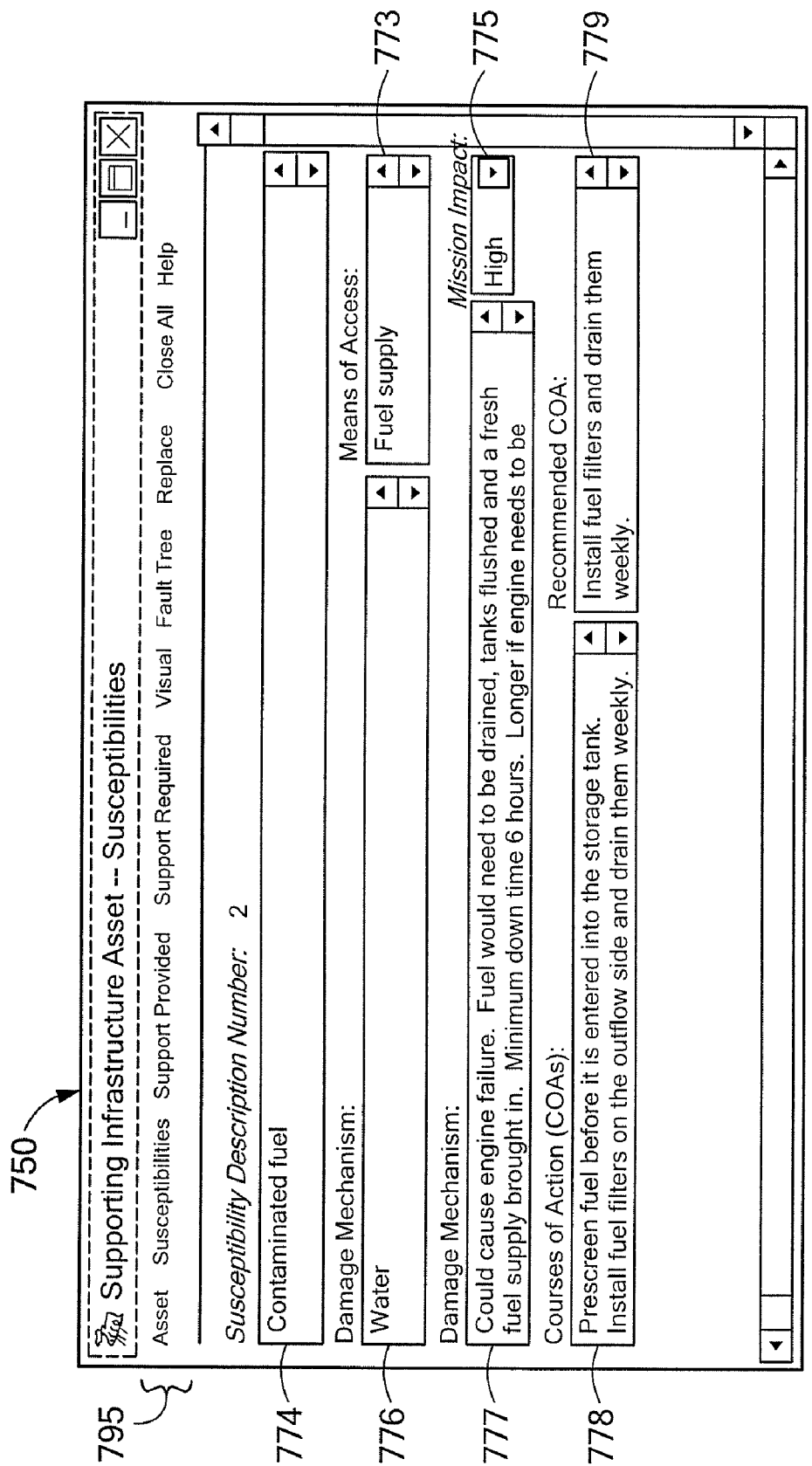
FIG. 7C is another pictorial representation of a display for infrastructure asset susceptibilities in accordance with exemplary embodiments of the inventive systems, techniques, and concepts.

FIG. 7C shows another example of a course of action for a fuel storage tank support asset. As shown on display screen 750, the identified susceptibility 774 is contaminated fuel stored in the storage tank, the damage mechanism 776 is from water, and means of access 773 is via the fuel supply to the fuel storage tank. Further, the impact 777 of contaminated fuel is described, along with the mission impact 775, a course of action 778, and a recommended course of action 779. The susceptibility information may be retrieved from a database.

A user may manually adjust the susceptibility information based on the completion of a course of action 778 (or multiple courses of action). For example, a countermeasure may be to alter a physical appearance of a support asset so that the support asset is less recognizable to a threat suspect, such as painting the support asset in camouflage. After completion of the countermeasure, the user may reduce the vulnerability index level (since the support asset will be obscured from view) and the mission impact 775 of the support asset from high to medium. This information can be updated in the database.

The fault tree tab displays fault trees which allow a user to examine an impact on the mission support network when removing a support provided by one or more infrastructure assets defined down to the sub-component level in the fault trees. In some cases, the support may not be completely removed, but reduced in capacity or degraded. The fault trees may be accompanied by detailed reports on the impact to the network. Further, the detailed reports may include information about asset weaknesses, including how terror suspects may exploit asset weaknesses. The detailed reports may also include information related to the steps required to replace a failed or degraded asset with another asset, and the steps and time required to bring an asset back online. In a further embodiment, the detailed reports may be produced in a user-friendly format, such as a spread sheet outputted by a computer program such as Microsoft Excel from the Microsoft Corporation.

The visual tab includes photographs of an infrastructure asset, which may include photographs of the surroundings of the asset. Such photographs may aide users in developing mitigation plans and actions to reduce asset vulnerability and provide useful visual references to first responders.

Figure 7D:
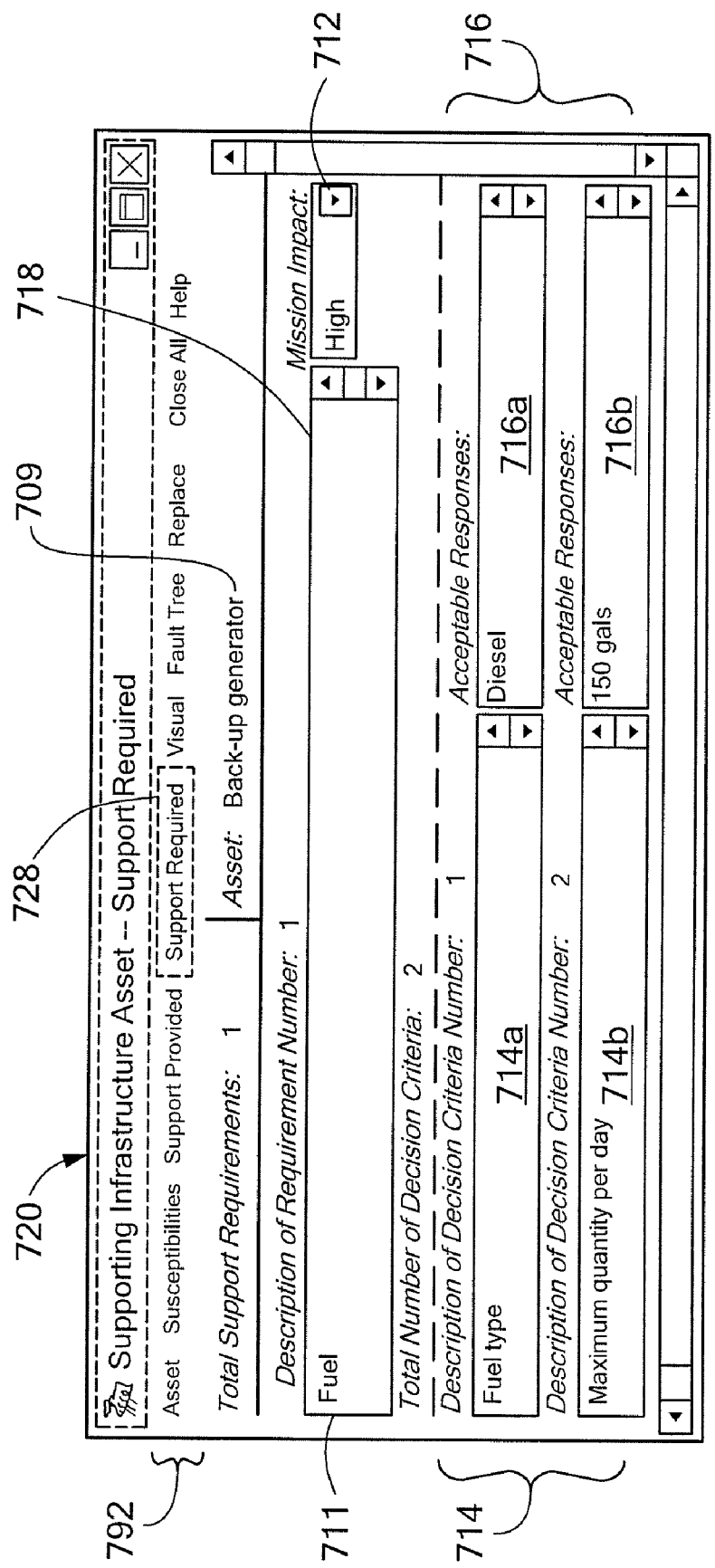
FIG. 7D is a pictorial representation of a display for an infrastructure asset support requirements in accordance with exemplary embodiments of the inventive systems, techniques, and concepts.

FIG. 7D shows the support required tab 728 on display screen 720 for a backup generator asset, as indicated by infrastructure asset label 709. An infrastructure asset requirement input box 718 may be used to display and input a support requirement for the asset 711, such as "Fuel", and a mission impact selector 712 may be used to display and select a mission impact of the infrastructure asset based on an impact on a mission if the required support is degraded or fails during the mission. The impact may be determined by known data recorded from previous mission executions, and/or design constraints and specifications of the infrastructure asset. For example, a combat mission may include combat mission assets such as aircraft. The aircraft requires fuel to operate. A fuel transportation infrastructure asset provides the required fuel to the aircraft. It may be determined that the fuel transportation asset is the only transportation asset for the mission. For example, the fuel transportation asset may the only road capable of transporting fuel via tanker trucks to an aircraft strip. Thus, if the road is degraded or failed, the tanker truck may not be able to complete its mission of providing fuel to the aircraft. Failure of the aircraft to receive the required fuel may result in the aircraft running out of fuel causing the combat mission to fail. Based on this information, the impact of a degraded or failed road can be determined to be high. An example of a degraded road may be that a portion of the road is under attack, and therefore, fuel supply trucks require extra time to traverse the road to allow for other combat assets stop the attack. The fuel supply road may fail when the enemy destroys one of the road's bridges, making the road impassable.

An infrastructure asset has one or more support requirement decision criteria which indicate one or more types of support required by the asset. The top-down mission requirements based dependency approach uses the decision criteria to select a support asset capable of meeting the support requirement. For example, the backup generator asset described above requires 150 gallons of diesel fuel to operate each day. Here, the backup generator asset can be described as having two decision criteria 714; a fuel type 714a and a maximum quantity per day 714b. The backup generator has two acceptable responses 716 for the respective decision criteria; diesel fuel 716a and 150 gallons/day 716b. These values may be based on the design constraints and specifications of the infrastructure asset.

Figure 7E:
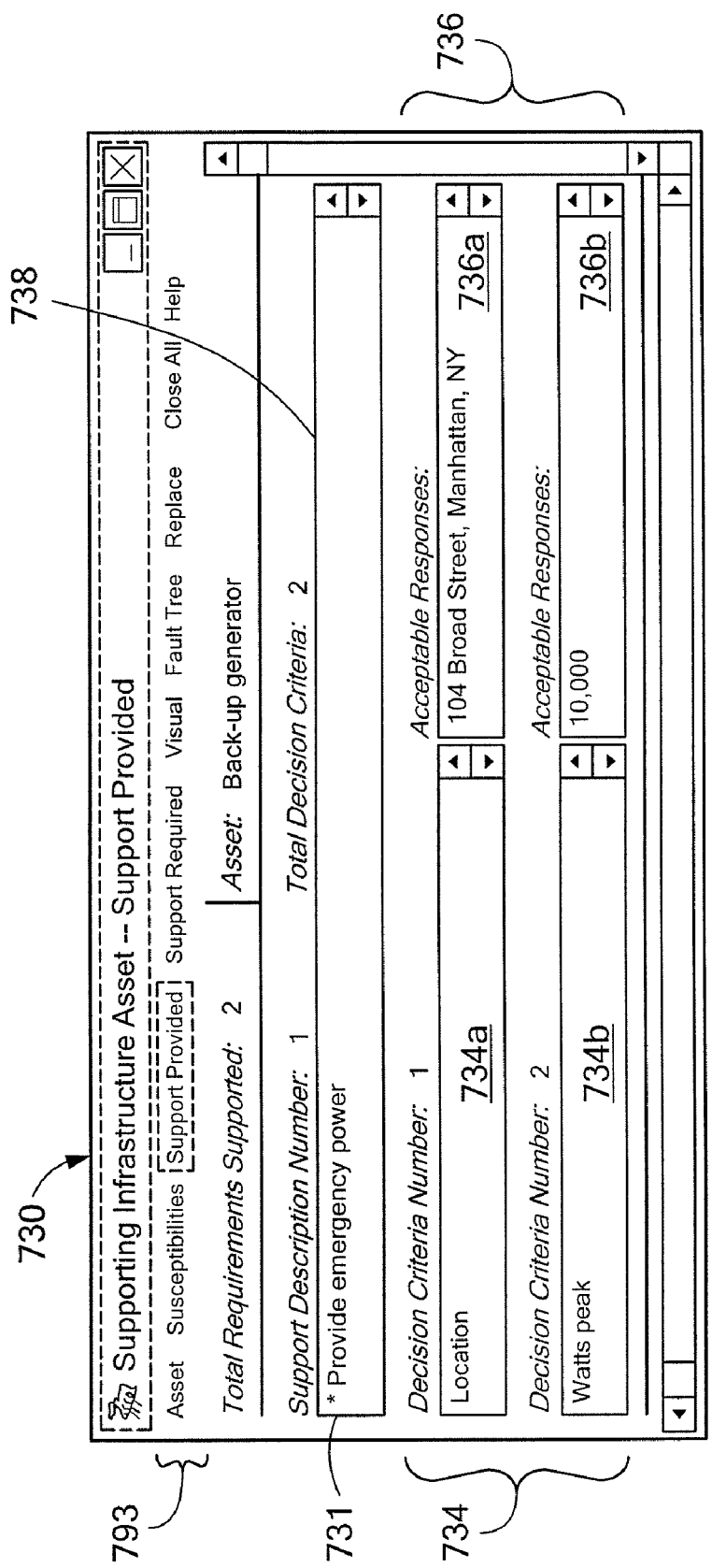
FIG. 7E is a pictorial representation of a display for support provided by an infrastructure asset in accordance with exemplary embodiments of the inventive systems, techniques, and concepts.

As shown in FIG. 7E, an infrastructure asset can have one or more support provided decision criteria which indicate a type of support provided by the asset. An infrastructure asset requirement input box 738 may be used to display and input a support provided by the asset 731, such as "Provide emergency power". The top-down mission requirements based dependency approach uses the support provided decision criteria to determine which, if any, other assets can be supported by the asset. For example, the backup generator asset may be located at 104 Broad Street in Manhattan, New York and provide 10,000 peak watts of power. Here, the backup generator asset depicted in display screen 730 has two support provided decision criteria 734; a location 734a and a watts peak 734b. The backup generator asset has two acceptable responses 736 for the respective decision criteria; 104 Broad Street 736a and 10,000 watts 736b. As with the support requirement decision criteria 714, the acceptable responses 736 may be based on the design constraints and specifications of the infrastructure asset or on other criteria such as location.

Figures 7F, 8:
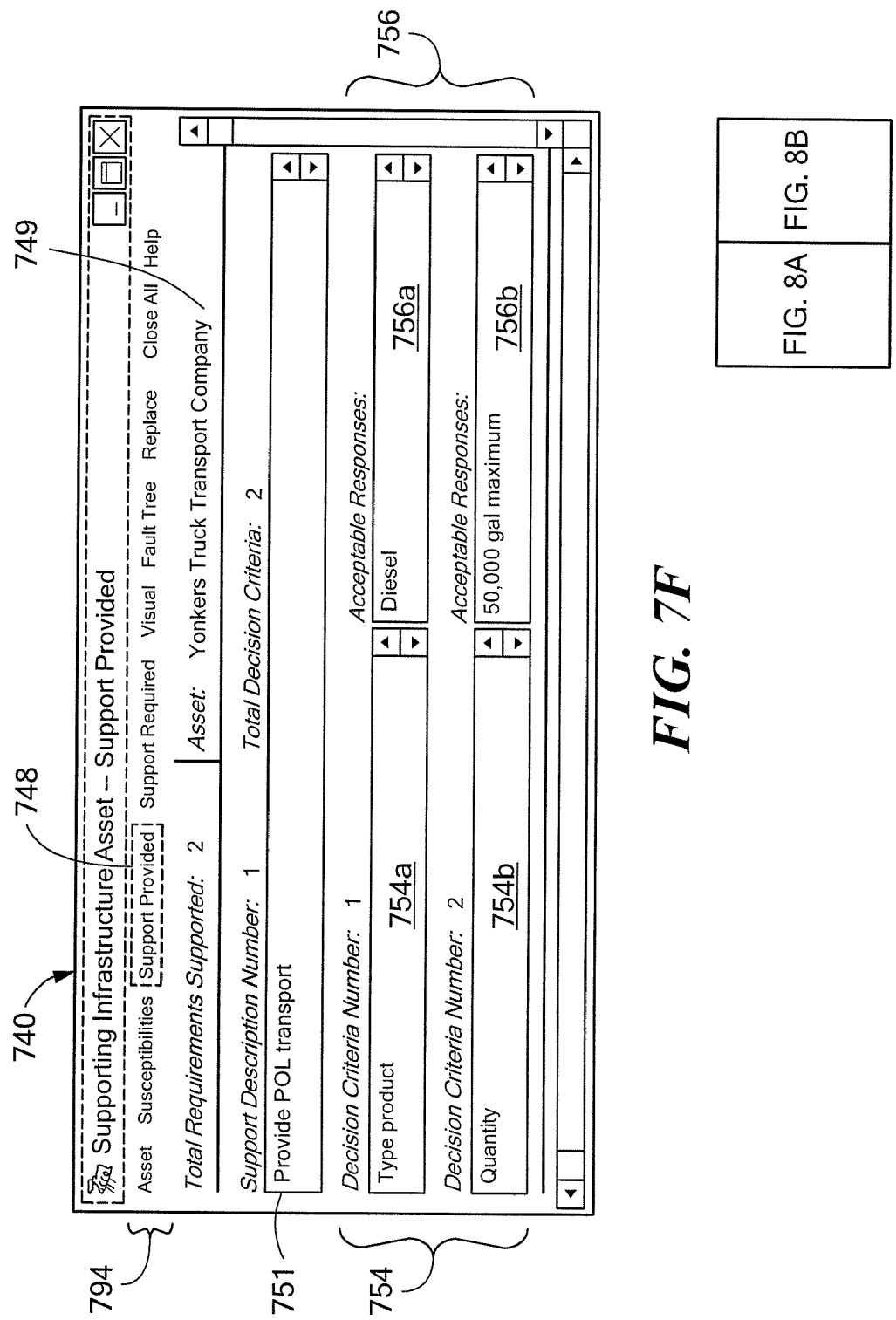
FIG. 7F is another pictorial representation of a display for support provided by an infrastructure asset capable of providing support to the asset displayed in FIG. 7D in accordance with exemplary embodiments of the inventive systems, techniques, and concepts.
FIG. 8 is a flow diagram of a top-down requirements based dependency method in accordance with exemplary embodiments of the inventive systems, techniques, and concepts.
Figure 8A:
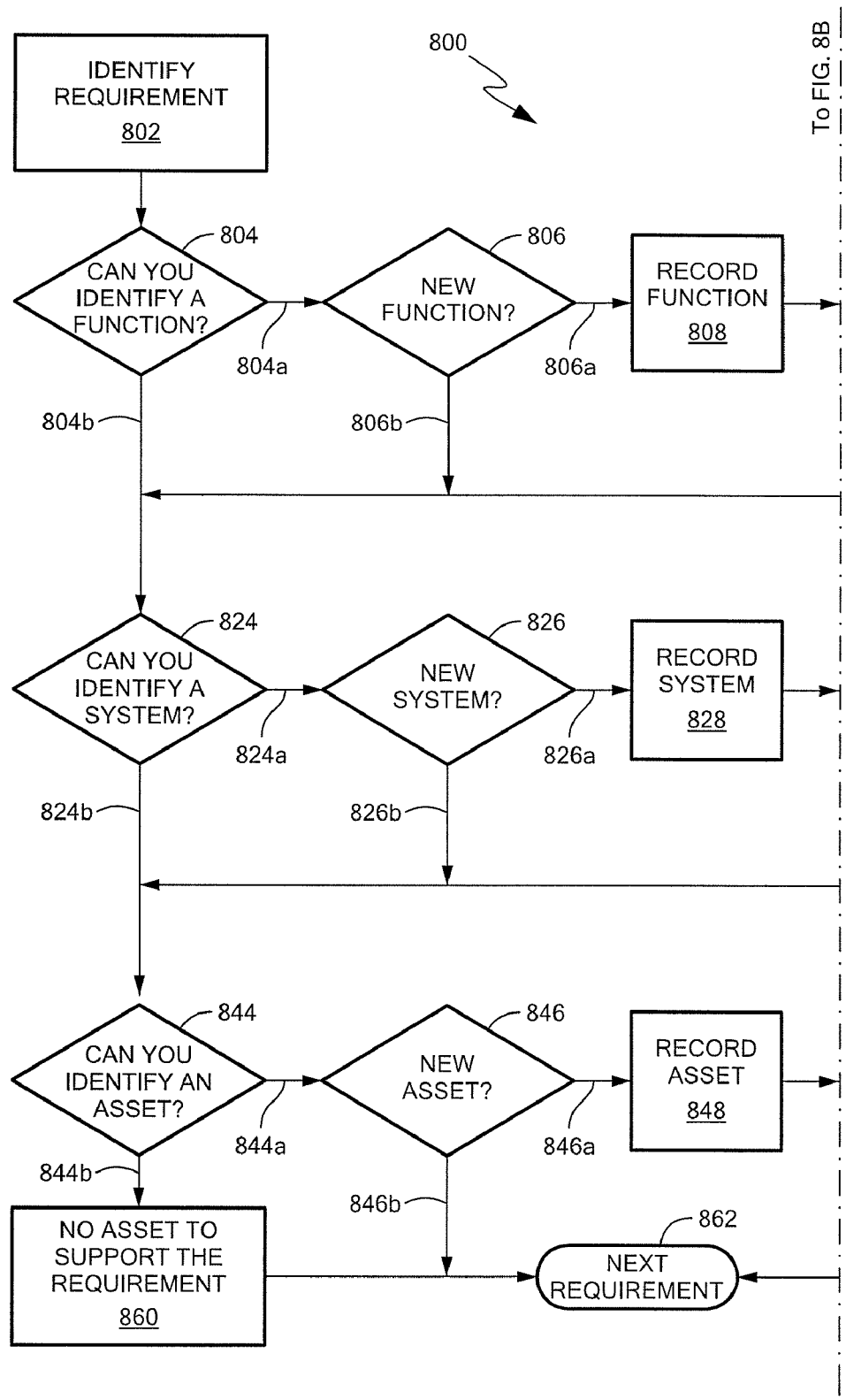
Figure 8B:
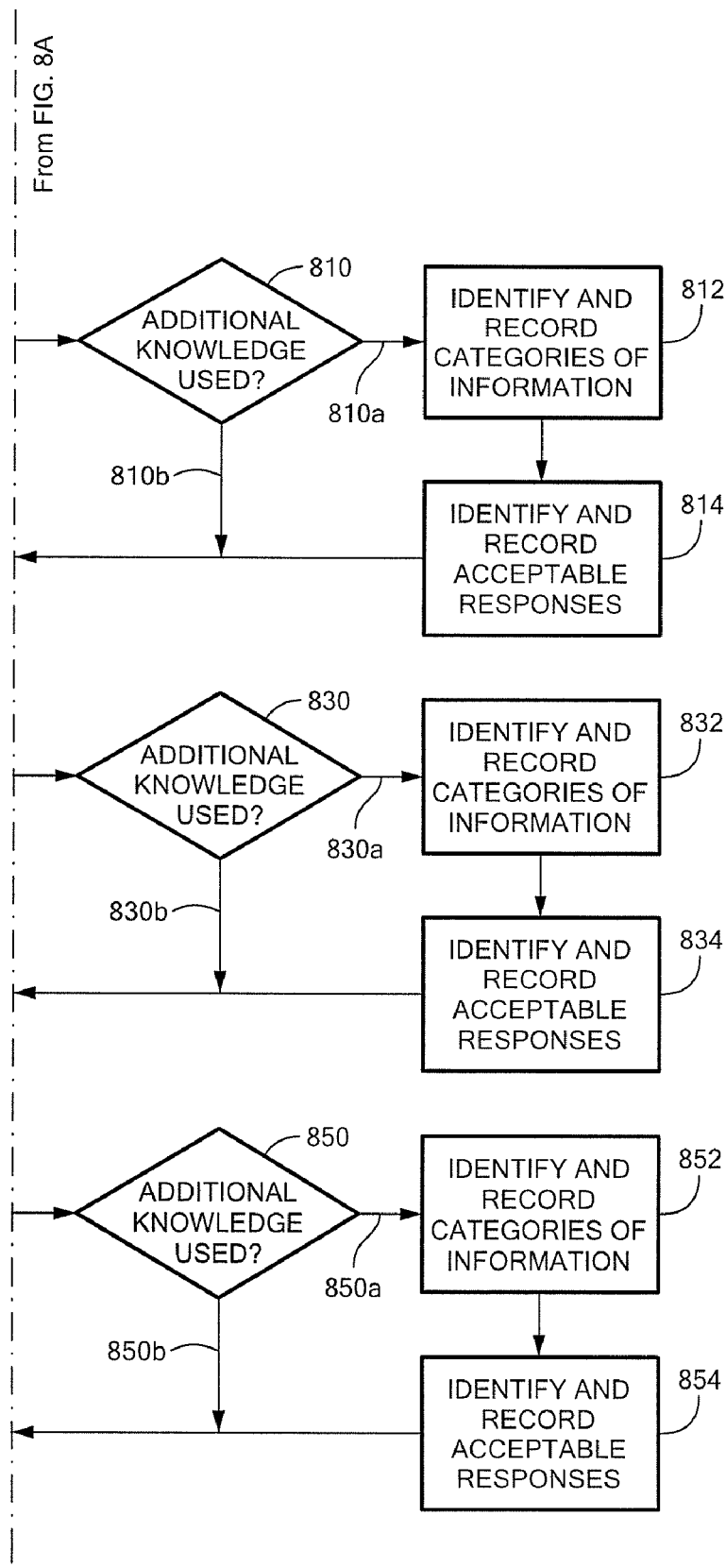

Based on the support required and support provided decision criteria for each infrastructure asset, the top-down mission requirements based dependency method can construct a mission support network by linking each asset's support requirements to another asset's support provided. For example, FIG. 7F shows a display screen 740 for a support asset labeled Yonkers Truck Transport Company (truck company) 749 capable of providing support to the backup generator support asset. The truck company provides support described as "Provide POL transport" 751 (POL stands for "petroleum, oils, and lubricants"), which has two support provided criteria 754, namely, "Type product" 754a and "Quantity" 754b having respective acceptable responses 756 of "Diesel" 756a and "50,000 gallon maximum" 756b. Thus, the truck company support asset can meet the backup generator asset's support requirements, because it supplies diesel fuel at an output of 50,000 gallons (maximum), which is well within the 150 gallons of diesel fuel per day required by the backup generator asset.

In another embodiment, the top-down mission requirements based dependency method is based on a set of rules for determining which infrastructure assets are capable of providing the support required by another asset. FIG. 8 illustrates an exemplary rules-based method 800 using two categories of information to define and apply the rules, namely, the decision criteria and the acceptable responses for each decision criteria. The rules and information needed to define and apply the rules may be stored in a database or a data file in a computer memory and accessed by a computer processor. The rules can be defined and recorded, along with the decision criteria and acceptable responses, as each support requirement is reviewed and linked with an appropriate support asset. Further, various sectors, functions, and systems which provide support can be identified and recorded. The method 800 may be automated and may access a predefined database of existing unlinked assets and missions to create asset linkages. Further, the predefined database may include relationships between sectors, functions, systems, and assets.

The exemplary rule-based method 800 will now be explained in further detail. In step 802, a requirement for support is identified. For example, a requirement exists for telephone services between two distant points. Next, the sector that provides that type of support is selected. Here, the selected sector is the telecommunications sector. In step 804, the method 800 determines whether a sector function to meet the requirement can be identified. For example, the functions of the telecommunication sector may include "provide long haul communications", which can provide telephone services between two distant points. Other types of functions may include "provide local wireless services", "provide station to station services," etc. If a function cannot be identified 804b, then there may not be a function that supports the requirement. If a function can be identified 804a, then the method 800 determines whether the function is new 806, i.e., has not yet been identified and recorded in the database. If the function is not new 806b, then the method 800 proceeds to the next step to identify a system. If the function is new 806a, then the new function is recorded in the database 808. Next, the method 800 determines whether additional knowledge was used to identify the function 810. If additional knowledge was used to identify the function 810a, then the additional knowledge is also identified and recorded in the database 812. For example, the additional knowledge may be a type of communications device, such as cell phone, land-line phone, internet or email services, etc. Further, the method 800 identifies and records decision criteria and acceptable responses 814. For example, the decision criteria may be media type, and the acceptable responses may be voice and/or data. If no additional knowledge was used 810b, then the method 800 proceeds to the next step.

In step 824, the method 800 uses the decision criteria and acceptable responses for the identified function to determine whether a system can be identified. Systems can include many infrastructure assets linked together. For example, a system to provide a long haul function can include a long-haul synchronous optical network (SONET). If a system cannot be identified 824b, then there may not be a system that supports the requirement. If a system can be identified 824a, then the method 800 determines whether the system is new 826, i.e., has not yet been identified and recorded in the database. If the system is not new 826b, then the method 800 proceeds to the next step to identify a support asset. If the system is new 826a, then the new system is recorded in the database 828. Next, the method 800 determines whether additional knowledge was used to identify the system 830. If additional knowledge was used to identify the system 830a, then the additional knowledge is also identified and recorded in the database 832. For example, the additional knowledge may be a type of networking equipment, etc. Further, the method 800 identifies and records decision criteria and acceptable responses 834 for the system. For example, the decision criteria may be a network device, and the acceptable responses may be the speed of the network device. If no additional knowledge was used 830b, then the method 800 proceeds to the next step.

In step 844, the method 800 uses the decision criteria and acceptable responses for the identified system to determine whether a support asset can be identified. Some of the support assets are singular in nature and perform a service for all resources in the system while other assets are duplicated in the system to allow services to be performed at multiple locations. If a support asset cannot be identified 844b, then no support asset supports the requirement, and the method 800 moves on to the next requirement 862. If a support asset can be identified 844a, then the method 800 determines whether the support asset is new 846, i.e., has not yet been identified and recorded in the database. If the support asset is not new 846b, then the method 800 proceeds to the next requirement 862. If the support asset is new 846a, then the new support asset is recorded in the database 848. Next, the method 800 determines whether additional knowledge was used to identify the support asset 850. If additional knowledge was used to identify the support asset 850a, then the additional knowledge is also identified and recorded in the database 852. Further, the method 800 identifies and records decision criteria and acceptable responses 854 for the support asset. For example, the decision criteria may be a support asset location, and the acceptable responses may be the location and distance from a user. If no additional knowledge was used 850b, then the method 800 proceeds to the next requirement 862.

Figures 9, 9A:
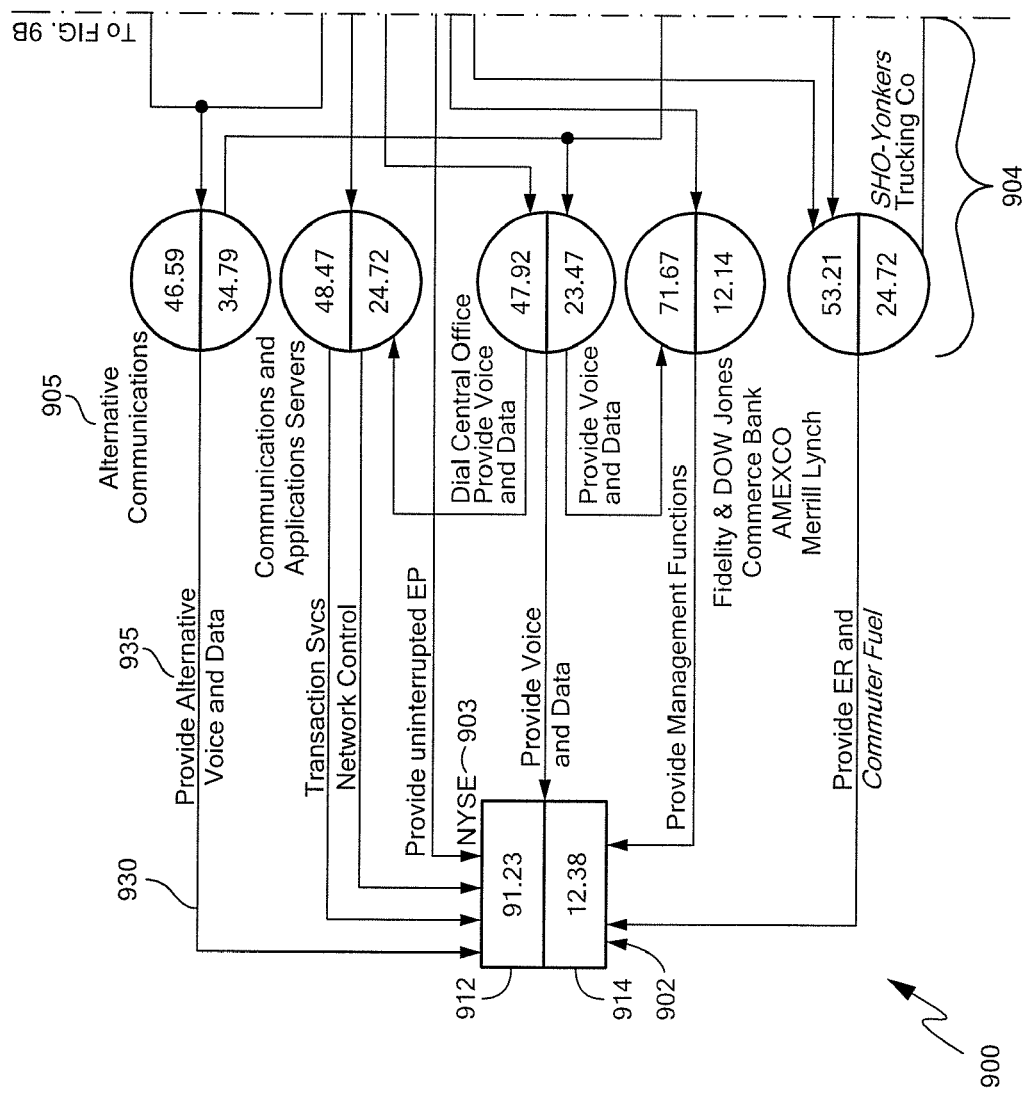
FIG. 9 is a pictorial representation of a display for a mission support network in accordance with exemplary embodiments of the inventive systems, techniques, and concepts.
Figure 9B:
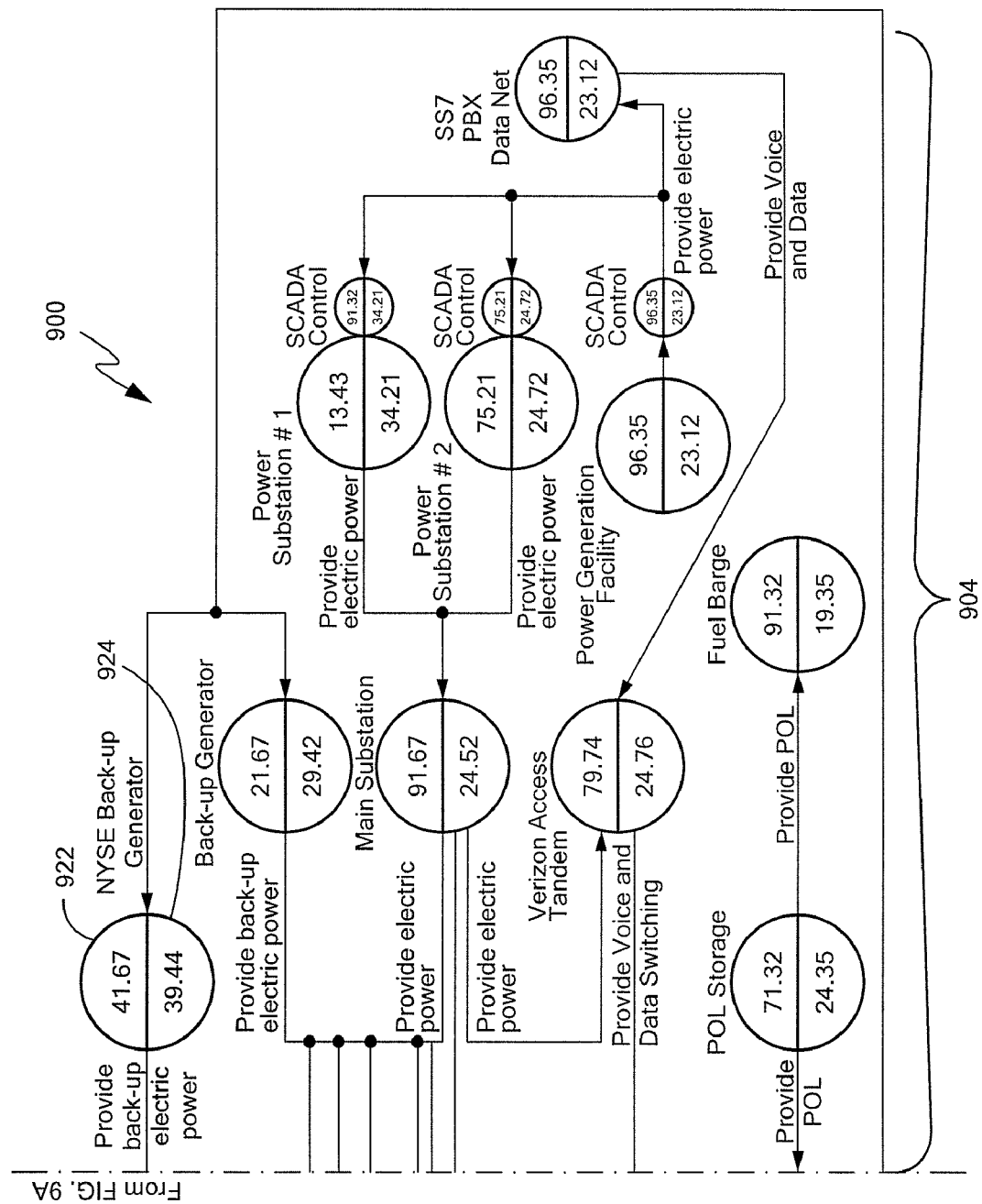

Referring now to FIG. 9, an exemplary display of a mission support network 900 constructed using, for example, the above-described top-down mission requirements based dependency methods, include, a mission asset 902 and support assets 904 to support a mission. Here, the mission may be network trading services for stock exchanges and, in particular, the NYSE stock exchange, as indicated by mission asset label designated by reference numeral 903. Each support asset 904 is identified by a support asset label, an example of which "Alternative Communications" is designated by reference numeral 905. The mission asset is characterized by a criticality index value 912 and a vulnerability index value 914, and each of the support assets is also characterized by criticality index value and a vulnerability index value, an example of which is designated by respective reference numerals 922, 924. The infrastructure assets are linked via support requirement arrows 930 indicating the support required by the pointed to asset and the support provided by the other linked asset. The support requirement links 930 are labeled, an example of which "Provide Alternative Voice and Data" is designated by reference numeral 935.

An asset is characterized by a vulnerability index value which is an assessment of the vulnerability of an asset, and a criticality index value which is the importance of an asset to a performance of a mission of the mission support network. The vulnerability index value may be derived by analysts with familiarity and/or expertise in the design and operation of assets. For example, an information technology (IT) analyst with expertise in networked systems may determine the vulnerability index values for servers and other components required to support data transactions for stock exchanges. The IT analyst may determine that one or more data servers are highly vulnerable to attacks and security breaches because of insufficient user authentication, virus protection, and/or firewall protection. Thus, the IT analyst may set the vulnerability index values for the one or more data server assets to high. However, the IT analyst may reduce the vulnerability index values for server assets after installing a proper firewall.

The criticality index values of an asset may be defined relative to one or more criticality index values of any other assets which also support the mission. Further, the criticality index value may be normalized to a number between 0 and 100, wherein a value of 100 is the maximum amount of asset importance to the mission. The criticality index value may be determined by mission analysts during a mission analysis process, including identifying the assets to perform and support missions of the mission support network, and determining the importance of each of the assets to the mission.

Criticality index values may be stored in a database, along with other asset information. The values may be displayed for the assets, for example, by associating the values with an asset icon on a display device. The asset icon may be displayed as a node in the mission support network to support a mission, and interlinked with other supporting infrastructure assets.

In a further embodiment, multiple missions of the mission support network may be selected and displayed. In such an embodiment, an infrastructure asset may support multiple missions, as well as other infrastructure assets. A combined criticality index value can be calculated that represents a combined importance of an infrastructure asset to all of the missions it supports. For example, an infrastructure asset may have a high importance to one mission, and a low importance to another mission.

A method for calculating a combined criticality index value for an infrastructure asset supporting multiple missions includes the following steps:
1. Select missions of a mission support network
2. Determine and assign a weighting factor to each of the selected missions
3. Calculate the combined criticality index values for each of the infrastructure assets.

Figure 10:
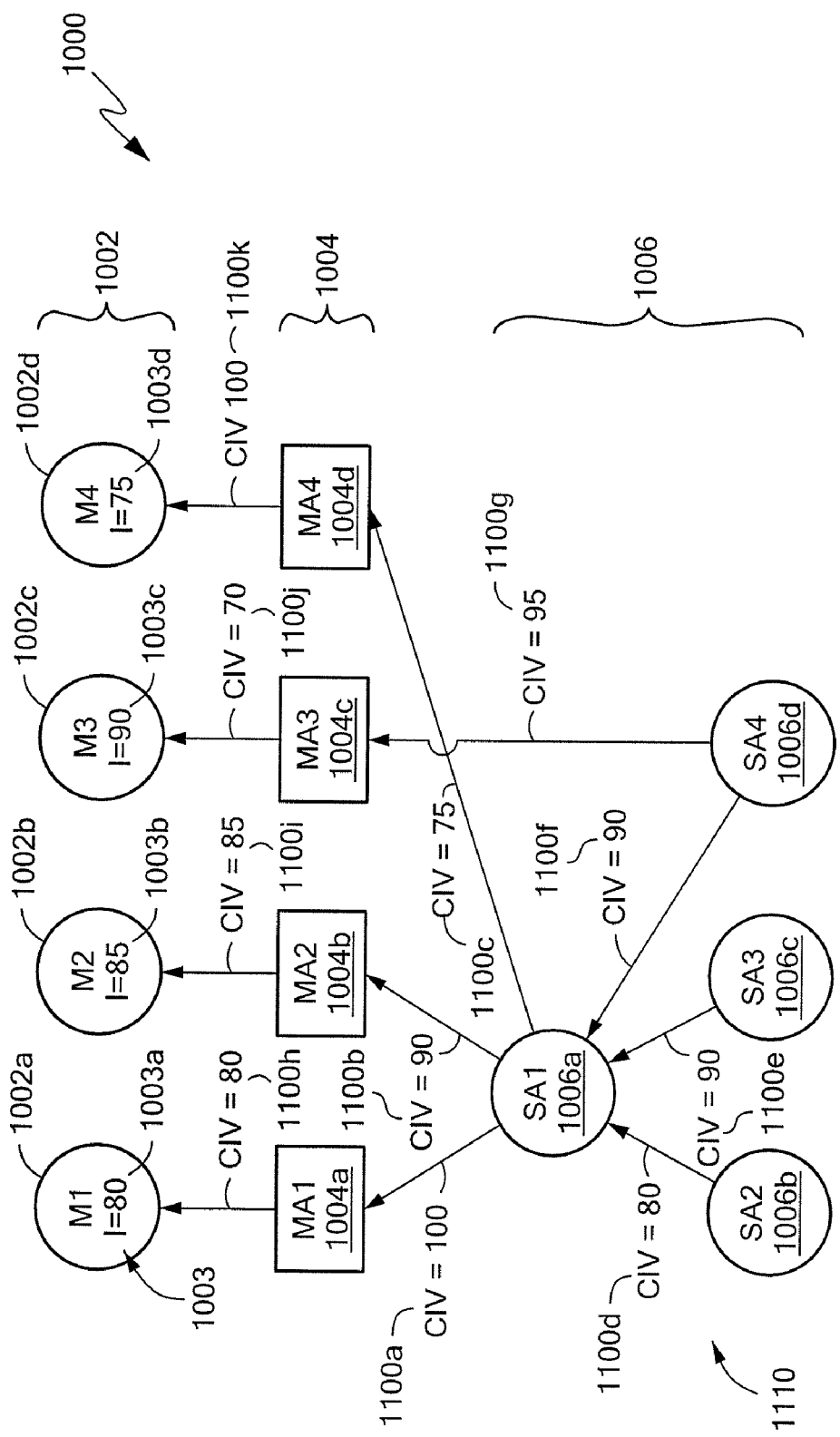
FIG. 10 is a pictorial representation of a mission support network used to exemplify the determination of normalized criticality index values in accordance with exemplary embodiments of the inventive systems, techniques, and concepts.

Before step 1, mission analysts can define each infrastructure asset's criticality index value in support of each mission. FIG. 10 shows the infrastructure support assets 1006 across a mission support network 1000 for four selected missions 1002, including four mission assets 1004. Each mission 1002 includes a weighting factor 1003 identifying an importance of the mission 1002. The weighting factors 1003 may be time and threat event dependent, and may be determined by users and/or algorithms combining real-time data and statistical models to calculate the weighting factors. For example, a statistical model may use reliability data to determine a likelihood of failure of a mission based on weather conditions.

Each of the mission assets 1004 supports one of the missions 1002. In particular, mission asset MA1 1004a supports mission M1 1002a, mission asset MA2 1004b supports mission M2 1002b, mission asset MA3 1004c supports mission M3 1002c, and mission asset MA4 1004d supports mission M4 1002d. Further, support asset SA1 1006a supports mission assets MA1, MA2, and MA4 (1004a, 1004b, and 1004d), support asset SA2 1006b supports support asset SA1 1006a, support asset SA3 1006c supports support asset SA1 1006a, and support asset SA4 1006d supports support asset SA1 1006a and mission asset MA3 1004c.

The weighting factors 1003a, 1003b, 1003c, 1003d, for the four respective missions 1002a, 1002b, 1002c, 1002d in the mission support network 1000 equal 80, 85, 90, and 75, respectively. Here, the weighting factors 1003 are normalized to a range between 0 and 100, although this is not necessary. Further, each mission asset 1004 has a criticality index value 1100 to indicate the importance of a mission asset to each mission 1002. In particular, mission assets MA1 1004a, MA2 1004b, MA3 1004c, and M4 1004d have criticality index values 1100h, 1100i, 1100j, and 1100k equal to 80, 85, 70 and 100 to indicate its importance to respective missions M1 1002a, M2 1002b, M3 1002c and M4 1002d. Further, each of the support assets 1006 has a criticality index value 1100 to indicate the importance of a support asset to each supported asset. In particular, support asset SA1 1006a has three criticality index values 1100a, 1100b, 1100c equal to 100, 90, and 75 to indicate its importance to respective assets MA1 1004a, MA2 1004b, and M4 1004d. Further, support asset SA2 1006b has a criticality index value 1100d equal to 80 for support asset SA1 1006a, support asset SA3 1006c has a criticality index value 1100e equal to 90 for support asset SA1 1006a, and support asset SA4 1106d has two criticality index values 1100f, 1100g equal to 90 and 95 to indicate its importance to respective assets SA1 1006a and MA3 1004c.

Table 1 summarizes the exemplary values and computed combined critical index values for the four support assets 1006 in mission support network 1000.

TABLE 1

| a Asset no. | b CIV per mission asset | c Supports asset no. | d Supported mission asset value | e Total asset value | f Supports Mission no | g Supported mission value | h Importance value | i Total CIV | j Normalized CIV |
|---|---|---|---|---|---|---|---|---|---|
| SA1 | 100 | MA1 | 80 | 80 | M1 | 80 | 64 | | |
| SA1 | 90 | MA2 | 85 | 76.55 | M2 | 85 | 65.025 | | |
| SA1 | 75 | MA4 | 100 | 75 | M4 | 75 | 56.25 | | |
| Total CIV | | | | 231.5 | | | 185.275 | 416.775 | 83.11 |
| SA2 | 80 | SA1 | 416.8 | 333.42 | | | | | |
| Total CIV | | | | 333.42 | | | 0 | 333.42 | 66.49 |
| SA3 | 90 | SA1 | 416.8 | 375.098 | | | | | |
| Total CIV | | | | 375.098 | | | 0 | 375.98 | 74.80 |
| SA4 | 90 | SA1 | 416.8 | 375.098 | | | | | |
| SA4 | 95 | MA3 | 70 | 66.5 | M3 | 90 | 59.85 | | |
| Total CIV | | | | 441.598 | | | 59.85 | 501.448 | 100.00 |

A set of formulas may be used to calculate the combined criticality index values for each of the support assets. A support asset's importance value for each mission is shown in column h of Table 1. This value may be calculated by multiplying the criticality index value for each mission asset in column c by the mission importance value in column g, as shown in Equation 1:

$$h=(e/100)*g \qquad \text{Equation 1:}$$

The support asset's total importance value for each mission in column e may be calculated by multiplying column h by column b, as shown in Equation 2:

$$e=(b/100)*d \qquad \text{Equation 2:}$$

The total criticality index value i for the support asset may be calculated by summing columns h and e and summing the results, as shown in Equation 3:

$$\text{Total } CIV(i)=\text{sum}(h)+\text{sum}(e) \qquad \text{Equation 3:}$$

The total criticality index value i for each support asset may be normalized (j) by using a ratio of the result in column i and the largest total criticality index value in column i, as shown in Equation 4:

$$\text{Normalized } CIV(j)=(\text{Total } CIV(i)/\text{greatest Total } CIV(i))*100 \qquad \text{Equation 4:}$$

In this example, support asset SA4 1006*d* has the greatest combined criticality index value because it either directly or indirectly supports all four missions 1002, even though support asset SA1 1006*a* provides direct support to three missions M1, M2, and M4 (1002*a*, 1002*b*, 1002*d*). This is because support asset SA1 1006*a* would be unable to provide support to missions M1, M2, and M4 (1002*a*, 1002*b*, 1002*d*) without support from support asset SA4 1006*d*. Hence, it can be seen that a support asset's combined criticality in the mission support network includes not only a measure of its direct importance to specific missions, but also a measure of its indirect importance to missions via its support of other supporting assets.

Threat events applied to the mission support network will now be described in further detail. A threat event may include information such as the type of threat, a damage mechanism, a means of delivery, an identification number, a threatened area, an area type, an intent of the threat suspect (if applicable), an assessment of the threat suspect's ability to carry out the threat, a threat rating, one or more threat reports, a threat reporting source, threat report date and reliability, location, and any other relevant threat information. For illustrative purposes only, Table 2 portrays examples of threat events and a subset of the relevant information a hurricane and a terrorist attack.

TABLE 2

| INFORMATION | | THREAT |
|---|---|---|
| TYPE | HURRICANE | TERRORIST ATTACK |
| DAMAGE MECH. | MOISTURE | EXPLOSIVE, BIO-AGENT |
| MEANS OF DELIVERY | FLOOD WATERS | ROAD-SIDE VAN, RELEASE |
| THREATENED AREA | NORTHEAST CORRIDOR | MAJOR CITY |
| REGION TYPE | FEMA | HOMELAND SECURITY |
| SUSPECT INTENT | N/A | UNKNOWN |
| SUSPECT CAPABILITY | N/A | LOW |
| RATING OF THREAT | HIGH | LOW |
| NUMBER OF REPORTS | | 14 |
| REPORT RELIABILTY | HIGH | MEDIUM |
| LOCATION | LAT, LON | LAT, LON |

Note that a threat suspect may mature into a threat perpetrator when the threat is actually carried out.

Figure 11:
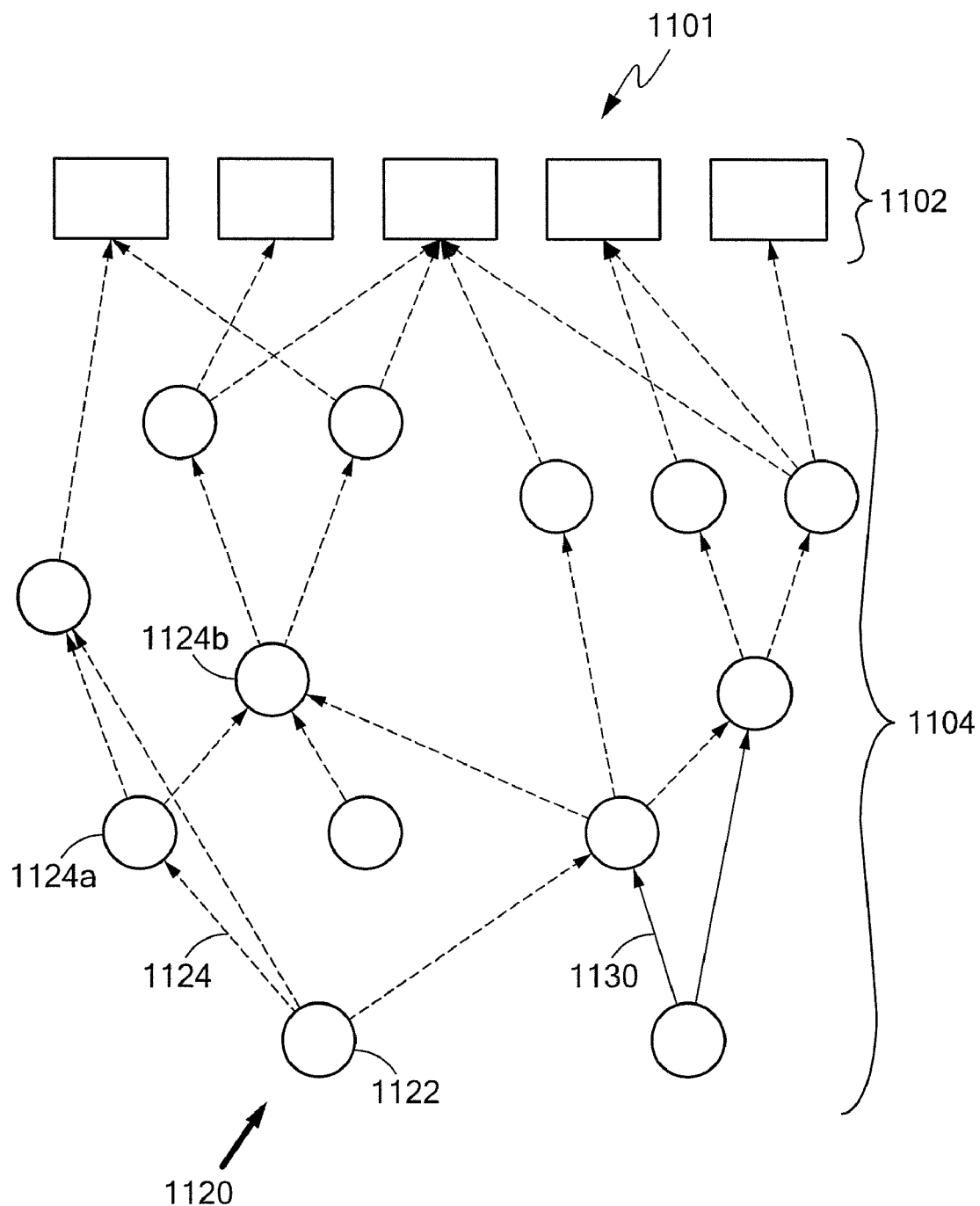
FIG. 11 is a pictorial representation of a threat placed on a mission support network in accordance with exemplary embodiments of the inventive systems, techniques, and concepts.

The inventive systems, techniques, and concepts described herein can be directed toward a "bottoms-up" risk analysis of an impact of a threat event applied to a mission support network. The mission support network can be constructed, for example, by using the above-described top-down mission requirements based dependency methods, and the threat event can be applied to a mission asset or a support asset, which can be referred to as a threatened asset. Referring to FIG. 11, a threat 1120 can be applied to a threatened support asset 1122 of a mission support network 1101 comprising mission assets 1102 and support assets 1104. The threat event 1120 can impact the infrastructure assets linked 1124 to the threatened asset 1122. Some of the infrastructure assets may be directly linked 1124*a*, and some may be indirectly linked 1 124*b*. As can be seen by the dotted lines 1124, an original impact of the threat event 1120 to the threatened support asset 1122 can affect a large portion of the mission support network 1101, including the mission assets 1102 directly supporting missions. It should be noted that a portion of the mission support network 1101, represented by unlinked infrastructure assets and designed by the solid lines 1130, may not be affected by the threat event 1120. The threat event 1120 can be analyzed with respect to a disruption, degradation, and/or failure of the threatened support asset 1122 and as well as to the chain of linked assets to obtain an overall risk analysis.

In an exemplary embodiment, a bottoms-up risk analysis identifies a real or perceived threat that acts on a vulnerability of a support asset, creates an adverse impact on the support being provided by the support asset, and traces a "ripple effect" of impacts through each link and node of an asset that is directly or indirectly supported by that the support asset. A risk value R to a mission support network can be generalized as a function of an impact I of a threat event, an asset's vulnerability V to a threat event, and the nature of the threat event T. The risk function can be represented by Equation 5:

$$R=I*(V*T) \qquad \text{Equation 5}$$

The risk analysis can begin by identifying the threat including the following information:

Threat parameters:
 Last reported location
 Threatened area
 Suspect intent
 Suspect capability to carry out threat
 Damage mechanism
 Means of delivery
 Rating of the threat
Threatened support asset parameters:
 Location
 Recognition factor
 Damage mechanism to the threatened asset
 Means of damage delivery to the threatened asset
 Impact on the threatened asset
 Impact on the mission being performed by the threatened asset as a result of a direct threat
 Risk factor of missions from threatened assets
 Impact on a mission being performed by other support assets as a result of degraded threatened asset (indirect)

Based on the identified threat, assess the threat factors that may produce a risk to the mission support network and its missions. Threat factors may include:
 Whether a threat suspect has the intent and capability to act against the threatened asset
 Whether a threat report is reliable
 Last reported known threat location or area threatened
 Known damage mechanism and means of delivery Next, identify proximity of support asset to the area threatened by the threat, for example, by comparing the threatened area to the support asset location to determine if they overlap.

For example, a support asset may be located within a 100-year flood zone (area threatened) of an overflowing river from a storm surge. Further, obtain an assessment of the vulnerability of proximate support assets to the damage mechanism and means of delivery of the threat. The support asset may also have a recognition factor $R_F$, which is the degree to which a support asset is recognizable to a threat suspect such as a terrorist. For example, an airport and aircraft may have high recognition factors, whereas an enclosed substation and an underground water main may have low recognition factors.

The risk analysis may also include threat factors for assessing impacts to support assets up the chain from the threatened support asset. Such factors include identifying the linked support assets and the type of support provided, as well as impacts from failed and/or degraded support assets.

Risk value calculation will now be described in more detail. In an exemplary embodiment, a risk value R of a support asset exposed to a threat may be calculated using a threat rating, such as an analyst's threat rating AR, a proximity P of the threat to the support asset, a recognition factor RF of the support asset to a threat suspect, a mission impact MI based on a vulnerability of the support asset to the threat (including damage mechanism and means of delivery), and a base vulnerability level index BV.

AR may be defined by an analyst, for example, it may be high, medium, low, or none when no risk exists according to the analyst. High, medium, and low values for AR, as well as other values, may be based on a range values. For example, if the range of high values is between 80 and 100, and the current AR is 91, then AR can be set to high. MI is based on the vulnerability of the support asset to the threat, for example, high, medium, low, or none when support asset is not vulnerable to the threat. For multiple threats applied to the support asset, MI can be set to the highest MI. An initial risk value R_I may be set to the greater of (AR*MI)/100 or BV.

$R_1$ may be adjusted based on a recognition factor $R_F$ as follows:
   $R_F$=High, then no change in $R_I$
   $R_F$=Medium and $R_I$=High or Medium, then adjust $R_I$ to Medium
   $R_F$=Medium and $R_I$=Low, then no change in risk
   $R_F$=Low and $R_I$=High, Medium or Low, then adjust $R_I$ to "Low"
   $R_F$=Low and $R_I$=None, then no change in $R_I$.
   $R_F$=None, then risk to asset=None, so change $R_I$ to BV $R_I$ may be further adjusted based on proximity of support asset to the threat as follows:
   P=Local, then no change in $R_I$
   P=Regional and $R_I$=High or Medium, then adjust $R_I$ to "Medium"
   P=Regional and $R_I$=Low, then no change in $R_I$
   P=National and $R_I$=High, Medium or Low, then adjust $R_I$ to "Low"
   P=National and $R_I$=None, then no change in $R_I$.
   P=Global, then no change in $R_I$.

Note that for a single threat, the risk value of the support provided by the asset may be the same as the risk value to the support asset.

In a further exemplary embodiment, a risk value R of a support asset to an indirect threat is based on the support asset's dependency on another support asset that has been degraded by the threat. Here, R may be calculated using a current vulnerability level of the other targeted support asset BV, the status of the support requirement SSR provided by the other targeted support asset and a mission impact MI if the supported asset does not receive the support required from the other targeted support asset. SSR and MI may be high, medium, low, or none.

An initial risk value $R_I$ may be equal to BV. If SSR=BV, then no change to $R_I$. If SSR does not equal BV, then adjust $R_I$ based on SSR and MI, according to the following steps:
   Compute $\chi$=(Square root of (100−BV))/3
   Now set a first risk value $r_1$
   If SSR=High or corresponding risk level of BV=High, then $r_1=\chi*3$
   If SSR=Medium or corresponding risk level of BV=Medium, then $r_1=\chi*2$
   If SSR=Low or corresponding risk level of BV=Low, then $r_1=\chi*1$
   If SSR=None, then $r_1=0$
   Now set a second risk value $r_2$
   If MI=High, then $r_2=\chi*3$
   If MI=Medium, then $r_2=\chi*2$
   If MI=Low, then $r_2=\chi*1$
   If MI=None, then $r_2=0$
   $R_I=BV+(r_1*r_2)$ Note that for a single indirect threat and no direct threat, the risk value of the support provided by the asset may be the same as the risk value for the support asset.

In another exemplary embodiment, a risk value is based on multiple threat events applied to one or more targeted support assets. Here, an initial risk value is based on the support assets immediately impacted by the multiple threats, and propagated up the chain of support assets throughout a mission support network. An initial risk value $R_I$ for a targeted support asset having multiple threats applied to it may be adjusted as follows:
   Use the highest risk value from the calculation of each direct threat except when multiple direct threats are of the same risk value, in which case the next higher value is assumed. When greatest calculated risk value is high, then the final risk value is high. When the greatest calculated risk value is medium, then the final risk value is medium, except when there are multiple risk values of medium, in which case the final risk value is high. When the greatest calculated risk value is low, then the final risk value is low, except when there are multiple risk values equal to low, in which case the final risk value is medium.

An initial risk value $R_I$ to a support asset from multiple indirect targets may be adjusted as follows:
   Calculate the risk value of each indirect threat as described above, then take the worse case risk value from the calculation of each indirect threat, except when multiple indirect threats are of the same risk value, in which case the next higher level is assumed. When greatest calculated risk value is high, then the final risk value is high. When the greatest calculated risk value is medium, then the final risk value is medium, except when there are multiple risk values of medium, in which case the final risk value is high. When the greatest calculated risk value is low, then the final risk value is low, except when there are multiple risk values of low, in which case the final risk value is medium. If the support asset risk value reaches high, then no further calculation is required.

An initial risk value $R_I$ to a support asset from a combination of direct and indirect targets may be adjusted as follows:
   Calculate the risk value to a targeted support asset from a direct threat, and then calculate the risk value from the indirect threat to support assets up the chain in the mission support network.

Repeat for each subsequent direct threat and the ensuing indirect threats. For each subsequent calculation of direct or indirect threat, take the worse case risk value from the calculation of each threat, except when multiple threats are of the same risk value, in which case the next higher level is assumed.

The inventive systems, techniques, and concepts will now be described with reference to backup assets. Backup assets can be identified to serve as backups or replacements for support assets that are threatened or have vulnerabilities that may allow them to be threatened by future threat events. Further, backup assets may be identified for support assets that are not performing to the full support requirements of the supported infrastructure asset. An exemplary method for identifying one or more backup assets to replace a support asset may include searching a database of stored infrastructure assets to find potential backup assets that are able to provide the same support as the support asset to be replaced. This may include searching support asset information, such as the support provided information stored for each infrastructure asset. The method further includes returning the one or more potential infrastructure assets that could serve as backup assets. A user can select one of the returned assets to serve as a backup asset. The user may review the one or more returned assets to determine whether a particular returned asset can serve as a backup asset and still provide support to other assets. It may be, for example, that a returned asset may not be able to support other assets if selected as a backup asset. In a further embodiment, risk values for support assets of a mission support network may be recalculated based on the replacement of one of the supports with a selected backup asset.

It should be noted that backup assets may be identified before, during, or after an occurrence of a threat event. Identifying backup assets before a threat event allows the user to prepare, develop, and test remediation and mitigation plans. A mitigation plan may be a report listing backup and replaced support assets and/or any impacts on a mission support network, or may be a set of procedures or countermeasures to mitigate risks from threats.

Backup assets can also be employed during maintenance to temporarily replace support assets. Further, backup assets may also be identified during a threat event to replace failed or degraded support assets, or after a threat event during repairs to the mission support network.

The inventive systems, techniques, and concepts may also be directed toward identifying infrastructure assets that when threatened have the greatest impact on missions. This can be accomplished through user-defined "what if" drills. What-if drills allow the user to quickly identify high-risk support assets which can help users prioritize risk management tasks.

Figure 12:
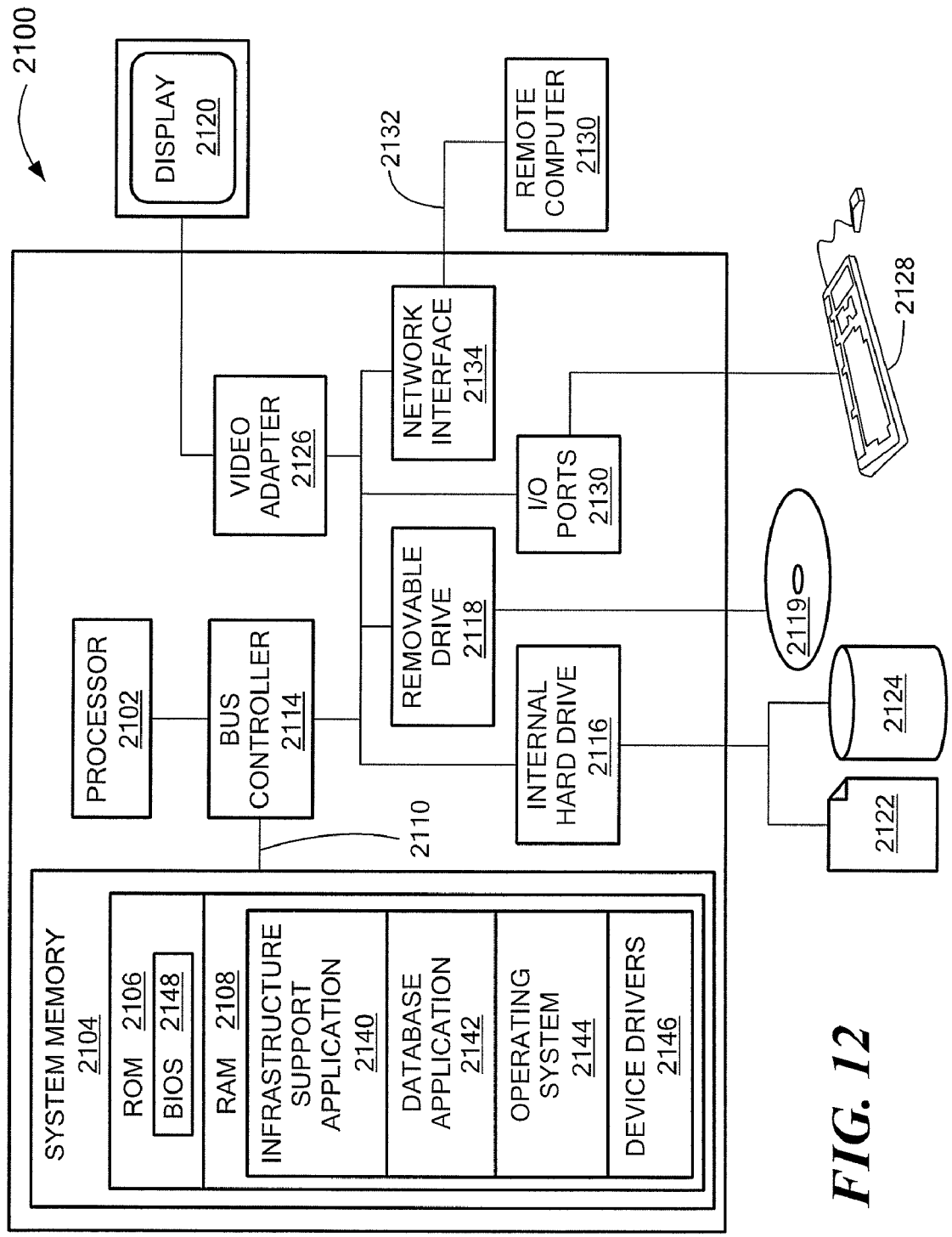
FIG. 12 is a diagram showing an exemplary hardware and operating environment of a suitable computer for use with embodiments of the invention.

FIG. 12 illustrates a computer 2100 suitable for supporting the operation of an embodiment of the inventive systems, concepts, and techniques described herein. The computer 2100 includes a processor 2102, for example, a dual-core processor, such as the AMD Athlon™ X2 Dual Core processor from the Advanced Micro Devices Corporation. However, it should be understood that the computer 2100 may use other microprocessors. Computer 2100 can represent any server, personal computer, laptop, or even a battery-powered mobile device such as a hand-held personal computer, personal digital assistant, or smart phone.

Computer 2100 includes a system memory 2104 which is connected to the processor 2102 by a system data/address bus 2110. System memory 2104 includes a read-only memory (ROM) 2106 and random access memory (RAM) 2108. The ROM 2106 represents a device that is primarily read-only including electrically erasable programmable read-only memory (EEPROM), flash memory, etc. RAM 2108 represents any random access memory such as Synchronous Dynamic Random Access Memory (SDRAM). The Basic Input/Output System (BIOS) 2148 for the computer 2100 is stored in ROM 2106 and loaded into RAM 2108 upon booting.

Within the computer 2100, input/output (I/O) bus 2112 is connected to the data/address bus 2110 via a bus controller 2114. In one embodiment, the I/O bus 2112 is implemented as a Peripheral Component Interconnect (PCI) bus. The bus controller 2114 examines all signals from the processor 2102 to route signals to the appropriate bus. Signals between processor 2102 and the system memory 2104 are passed through the bus controller 2114. However, signals from the processor 2102 intended for devices other than system memory 2104 are routed to the I/O bus 2112.

Various devices are connected to the I/O bus 2112 including internal hard drive 2116 and removable storage drive 2118 such as a CD-ROM drive used to read a compact disk 2119 or a floppy drive used to read a floppy disk. The internal hard drive 2116 is used to store data, such as in files 2122 and database 2124. Database 2124 includes a structured collection of data, such as a relational database. A display 2120, such as a cathode ray tube (CRT), liquid-crystal display (LCD), etc. is connected to the I/O bus 2112 via a video adapter 2126.

A user enters commands and information into the computer 2100 by using input devices 2128, such as a keyboard and a mouse, which are connected to I/O bus 2112 via I/O ports 2130. Other types of pointing devices that may be used include track balls, joy sticks, and tracking devices suitable for positioning a cursor on a display screen of the display 2120.

Computer 2100 may include a network interface 2134 to connect to a remote computer 2130, an intranet, or the Internet via network 2132. The network 2132 may be a local area network or any other suitable communications network.

Computer-readable modules and applications 2140, such as infrastructure support applications, and other data are typically stored on memory storage devices, which may include the internal hard drive 2116 or the compact disk 2119, and are copied to the RAM 2108 from the memory storage devices. In one embodiment, computer-readable modules and applications 2140 are stored in ROM 2106 and copied to RAM 2108 for execution, or are directly executed from ROM 2106. In still another embodiment, the computer-readable modules and applications 2140 are stored on external storage devices, for example, a hard drive of an external server computer, and delivered electronically from the external storage devices via network 2132.

The computer 2100 may execute a database application 2142, such as Oracle™ database from Oracle Corporation, to model, organize, and query data stored in database 2124. The data may be used by the computer-readable modules and applications 2140 and/or passed over the network 2132 to the remote computer 2130 and other systems.

In general, the operating system 2144 executes computer-readable modules and applications 2140 and carries out instructions issued by the user. For example, when the user wants to execute a computer-readable module 2140, the operating system 2144 interprets the instruction and causes the processor 2102 to load the computer-readable module 2140 into RAM 2108 from memory storage devices. Once the computer-readable module 2140 is loaded into RAM 2108, it can be used by the processor 2102 to carry out various instructions. The processor 2102 may also load portions of computer-readable modules and applications 2140 into RAM 2108 as needed. The operating system 2144 uses device drivers 2146 to interface with various devices, including memory storage devices, such as hard drive 2116 and removable storage drive 2118, network interface 2134, I/O ports 2130, video adapter 2126, and printers.

Figure 13:
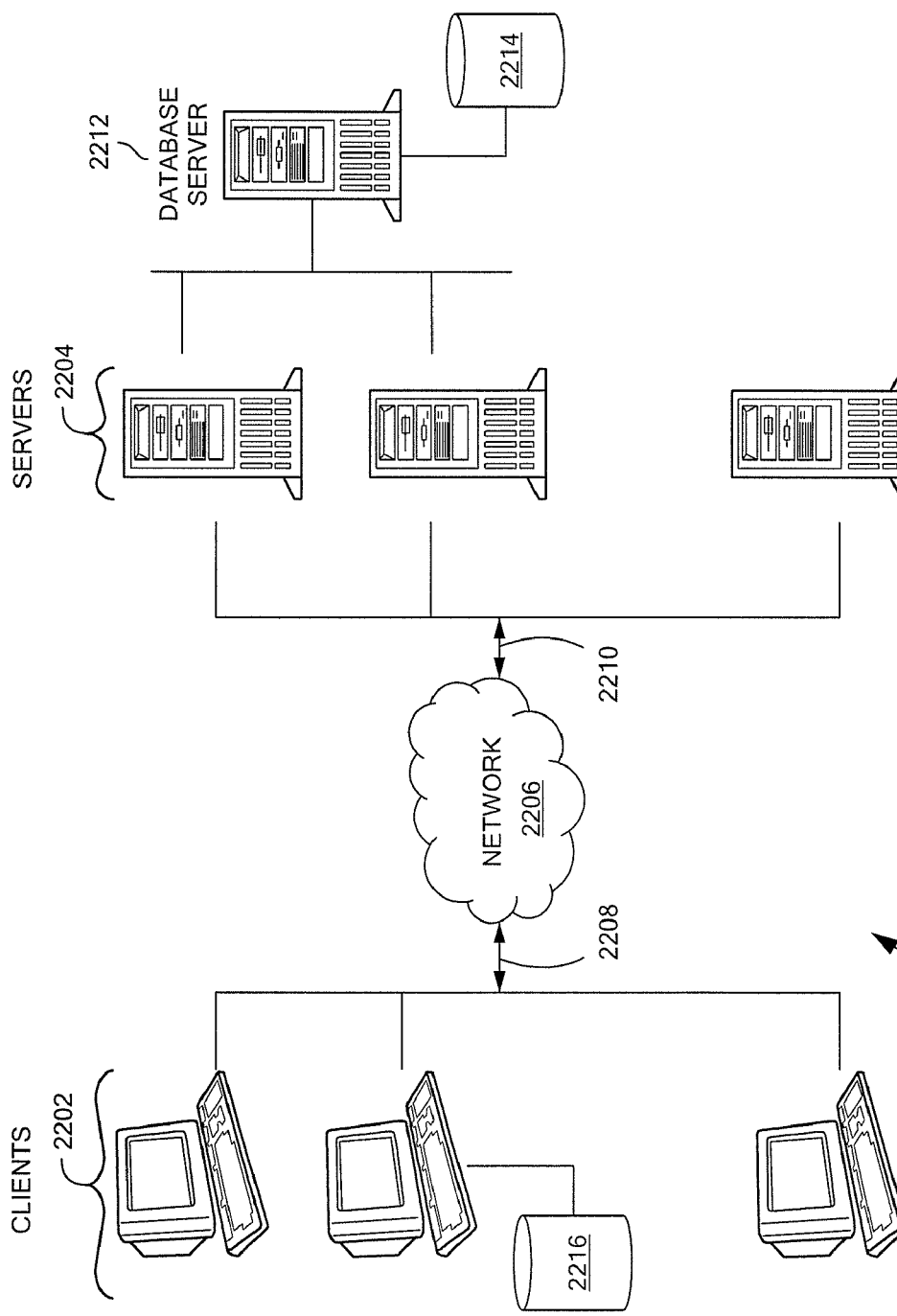
FIG. 13 is a diagram showing an exemplary client-server environment of a suitable for use with embodiments of the invention.

FIG. 13 illustrates a client-server environment 2200 for supporting the operation of an embodiment of the inventive systems, concepts, and techniques described herein. Client computers 2202 are coupled to server computers 2204 via a network 2206, such as an intranet or the Internet. Client computer users may access applications and resources executing on the server computers 2204 by issuing requests 2208 over network 2206. The requests 2208 may include command-line options and data values to delineate the requests. Server computers 2204 accept and process requests 2208 and may access structured data stored in databases 2214 on database servers 2212. Server computers 2204 return information 2210 to the client computers 2202 via network 2206. In response, client computers 2202 provide information in an appropriate format to client users, for example, using a web client or other client computer-readable modules. In one embodiment, the client computer 2202 may execute a local application for supporting the operation of the inventive systems, concepts, and techniques described herein, which may include accessing a local copy of data in a local database 2216.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A machine-based method of mission support comprising:
   in a processor, identifying a requirement to support a mission;
   identifying a sector to support the requirement;
   identifying a function of the sector to support the requirement;
   in a memory, recording the identified function to support the requirement;
   recording additional knowledge used to identify the function to support the requirement;
   identifying an infrastructure asset to support the function;
   recording the identified infrastructure asset to support the function; and
   recording additional knowledge used to identify the infrastructure asset to support the function.

2. The method of claim 1, wherein recording the additional knowledge used to identify the infrastructure asset to support the function includes recording decision criteria and acceptable responses associated with the decision criteria.

3. A machine-based method of mission support comprising:
   in a processor, identifying a mission;
   identifying at least one infrastructure asset to support the mission; and
   building a mission support network to support the identified mission, wherein the mission support network comprises the at least one identified infrastructure asset characterized by a criticality index value to measure how important the at least one infrastructure asset is to a performance of the mission, and a vulnerability index value to measure a vulnerability of the at least one infrastructure asset to a threat on the mission.

4. The method of claim 3, further comprising:
   identifying a first sector comprising a plurality of first sector infrastructure assets and a
   second sector comprising a plurality of second sector infrastructure assets, wherein the at least one infrastructure asset is a plurality of infrastructure assets, a first portion of which includes at least one of the first sector infrastructure assets, and a second portion of which includes at least one of the second sector infrastructure assets.

5. The method of claim 3, wherein the at least one infrastructure asset includes a first mission asset to directly support a first mission and a second mission asset to directly support a second mission, further comprising:
   identifying an infrastructure support asset to support the first mission asset and the second mission asset, the infrastructure support asset characterized by a first support asset criticality index value to measure how important the infrastructure support asset is to a performance of the first mission and a second support asset criticality index value to measure how important the infrastructure support asset is to a performance of the second mission.

6. The method of claim 5, further comprising:
   determining a first mission importance value of the first mission and a second mission importance value of the second mission;
   determining a first importance value of the infrastructure support asset to a performance of the first mission, wherein the first importance value relates to the first support asset criticality index value;
   determining a second importance value of the infrastructure support asset to a performance of the second mission, wherein the second importance value relates to the second support asset criticality index value; and
   determining a combined criticality index value of the infrastructure support asset, wherein the combined criticality index value relates to the first and second importance values of the infrastructure support asset and the first and second mission importance values.

7. The method of claim 6, wherein said determining the combined criticality index value of the infrastructure support asset comprises:
   summing the first and second importance values of the infrastructure support asset to obtain a total importance value of the infrastructure support asset to a performance of the first and second missions;
   summing the first and second mission importance values for respective first and second missions to obtain a total mission importance value; and
   determining the combined criticality index value of the infrastructure support asset by summing the total importance value of the infrastructure support asset and the total mission importance value of the first and second missions.

* * * * *